US005601522A

United States Patent [19]
Piramoon

[11] Patent Number: 5,601,522
[45] Date of Patent: Feb. 11, 1997

[54] FIXED ANGLE COMPOSITE CENTRIFUGE ROTOR FABRICATION WITH FILAMENT WINDINGS ON ANGLED SURFACES

[75] Inventor: Alireza Piramoon, Santa Clara, Calif.

[73] Assignee: Piramoon Technologies, Mountain View, Calif.

[21] Appl. No.: 249,592

[22] Filed: May 26, 1994

[51] Int. Cl.$^6$ .................................................. B04B 5/02
[52] U.S. Cl. ........................... 494/16; 494/81; 29/527.1; 29/530; 29/889; 156/172; 156/430
[58] Field of Search ................................ 494/12, 16, 33, 494/43, 81, 85; 74/572; 156/166, 169, 172, 173, 175, 245, 425, 430, 431, 432; 29/527.1, 530, 889, 889.71

[56] References Cited

U.S. PATENT DOCUMENTS

| | | | |
|---|---|---|---|
| 4,738,656 | 4/1988 | Piramoon et al. | 494/81 |
| 4,781,669 | 11/1988 | Piramoon | 494/81 X |
| 4,790,808 | 12/1988 | Piramoon | 494/81 |
| 4,817,453 | 4/1989 | Breslich, Jr. et al. | 494/81 X |
| 4,824,429 | 4/1989 | Keunen et al. | 494/81 X |
| 5,057,071 | 10/1991 | Piramoon | 494/81 X |
| 5,362,301 | 11/1994 | Malekmadani et al. | 74/572 X |

*Primary Examiner*—Charles E. Cooley
*Attorney, Agent, or Firm*—Townsend and Townsend and Crew

[57] ABSTRACT

A fixed angle rotor and method of manufacture of a fixed angle rotor has a frustum shaped rotor having rounded surfaces reinforced by filament tow windings against both vertical and horizontal forces generated during centrifugation. A so-called "high speed" rotor has a bottom composite disc, a top composite disc, and a frustum shaped hollow fiber reinforced molded insert between the respective discs having a stepped exterior surface. An "ultra speed" rotor has a bottom composite disc, a top composite disc, and composite discs therebetween defining a stepped exterior surface. In both cases, these exterior steps have surfaces which capture the windings to the exterior of the rotor. A first class of individual fiber windings about the rotor is applied having a vertical reinforcement component parallel to the spin axis and normal to the laminate layers. These windings include either vertically disposed loops in grooves on the stepped exterior of the rotor which tie the top and bottom discs together (with the remainder of the rotor securely sandwiched therebetween) or vertically disposed windings in exterior grooves which extend over both top and bottom discs of the rotor. A second class of windings includes circumferential windings on the step surfaces of the rotor. Such windings are applied to fill in the stepped surfaces as well as to resist centrifugal forces of centrifugation.

32 Claims, 17 Drawing Sheets

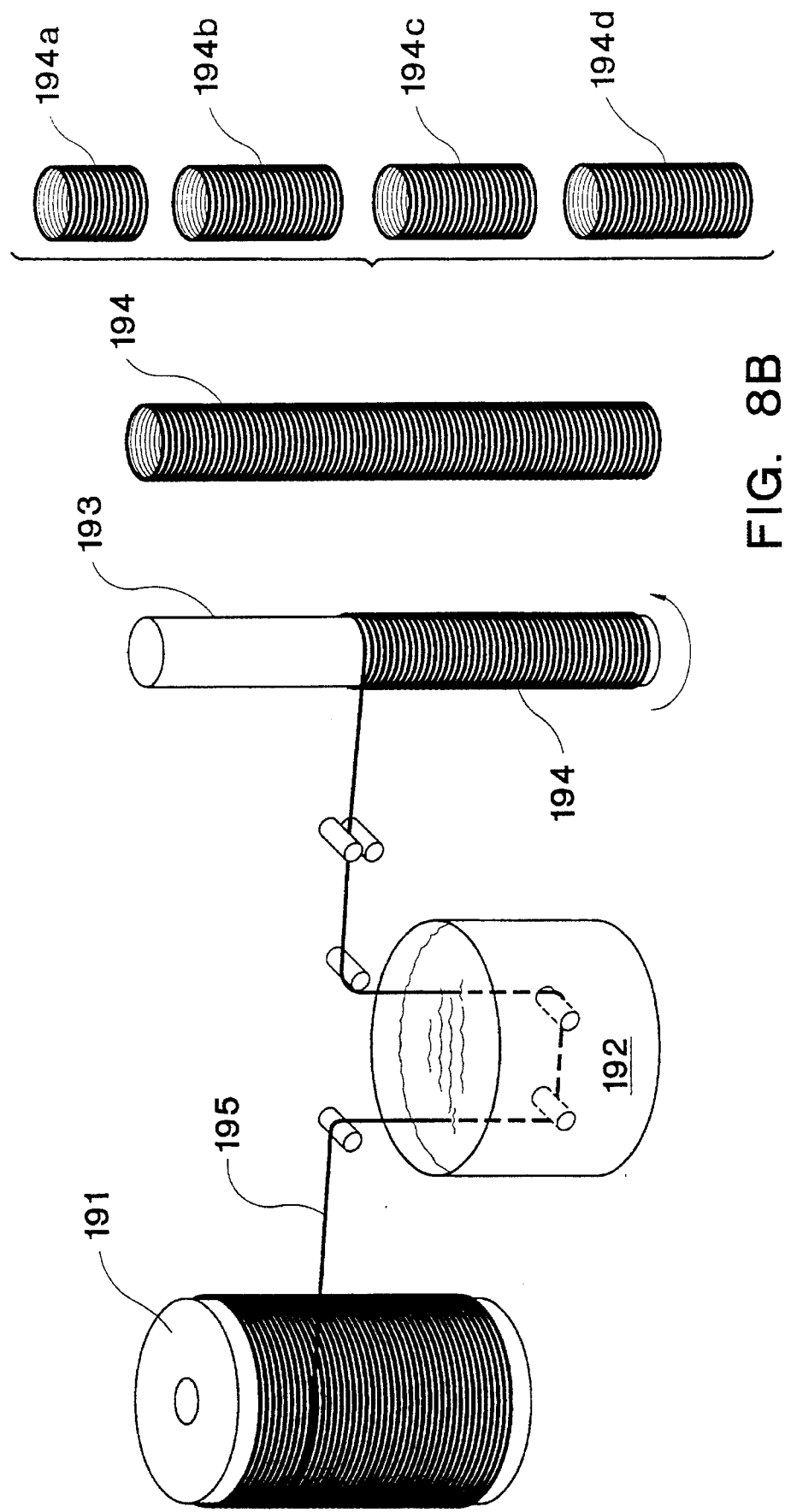

FIXED ANGLE COMPOSITE CENTRIFUGE ROTOR FABRICATION WITH FILAMENT WINDINGS ON ANGLED SURFACES

This invention relates to centrifuge rotors. More particularly, this invention relates to a so-called composite material fixed angle centrifuge rotor with the composite material having quasi-isotropic properties. These properties include high resistance to centrifugal forces in the plane normal to the spin axis and lower resistance to forces having a component parallel to the spin axis. Filament windings are disclosed for the resistance of centrifugal and parallel to the spin axis component forces generated by fixed angle rotors.

BACKGROUND OF THE INVENTION

Centrifuges are now well known and widely used in biological sample separation. Centrifuges utilize an abundant, readily available and easily understood force, gravity (G-force) in a relatively simple device called a centrifuge to facilitate particle/fluid separation on the bases of mass and density.

Centrifugation in life sciences involves a smooth, uniform application of G-forces resulting in high yield separation expressed as percentage of recovered target compound from the initial mixture at the end of the separation process. In addition, the separation takes place in a natural fluid, providing a gentle, homogenous cushion during centrifugation. Centrifugation helps maintain bioactivity of the target compound by preserving its conformation or three-dimensional shape. Maintaining both molecular and conformational structure of complex biomaterials is a very important strategy since a large number of biologically important compounds exist in less than nanogram quantities in nature.

This application relates to so-called "fixed-angle" rotors. In a fixed-angle rotor, multiple counterbalanced cavities are used to hold the sample mixture. These cavities are oriented at an angle in fixed-angle rotors with respect to the spin axis of the rotor. Bottles or test tubes containing the starting mixture are placed in the rotor cavities, and rotor is secured over a spindle attached to the centrifuge drive system. Centrifugation occurs.

After spinning the rotor at a predetermined speed for a period of time, the bottles with separated particles are taken out of the rotor. Then, both the supernatant and the sediments are removed from the bottles for further processing and experimentation.

Separation of small biomolecules require fast spinning in order to generate the required g-forces. Today's ultra class centrifuges reach over 100,000 rpm speeds and generate gravitational forces in excess of 600,000×Gs.

Containment of such high levels of force requires construction of structurally strong centrifuge rotors. Today, for high speed class centrifuges (with up to 30,000 rpm top speed), rotors are typically subjected to forces less than 100,000×Gs. Relatively light-weight and inexpensive, aluminum is used to manufacture high speed rotors.

Although more expensive and heavier, titanium is preferred for ultra centrifuge rotors because of its higher strength and higher corrosion resistance.

In both cases, however, constructing centrifuge rotors from metals poses a serious safety risk associated with their failure mode. Operational or fatigue-related structural break up of metal rotors during spinning can inflict heavy damage to the centrifuge, to the lab or even hurt the operator. In addition, some popular large rotors weigh as much as 60 pounds, raising serious back and spinal injury potential during handling.

During centrifugation, forces generated in rotors are centrifugal. Specifically, major forces normal or perpendicular to the spin axis of the rotor are encountered. For this reason, certain types of rotors have in the past been constructed from composite materials.

Composite materials have the property of being so-called "anisotropic." Specifically, such materials are fabricated tape or fabric laminates containing high tensile strength fibers such as carbon or Kevlar®, a registered trademark of the Du Pont Corporation of Wilmington, Del. The fibers in such materials can be uni-directional in a material commonly referred to as a composite "tape"—that is running in one direction only. In this case the material can be said to be "anisotropic" in its strength; the material has high tensile strength in the direction of the fibers but is otherwise weak normal to the fibers.

Additionally, the fibers in such materials can be multi-directional in a material typically referred to as composite "fabric"—that is running in more than one direction. In this case the material can be said to have bi-directional or multi-directional anisotropic properties in its strength; the material has high tensile strength in the direction of the fibers, which by definition runs in more than one direction.

In the case of centrifuge rotors, it is known to build multiple discrete layers of such material into discs or "billets" of such fabric or tape. Each successive billet layer is rotated with respect to the previously placed layers. The layers are typically fastened one to another. And when such fastening occurs, adjacent layers with anisotropic properties in one direction impart their resistance to adjoining layers with their anisotropic properties aligned in different directions. The discs or billets can in turn be assembled to form a finished article. The finished article can be said to be "quasi-isotropic."

The fabric or tape is built up of multiple discrete layers with the fibers of the fabric normal to the spin axis of the rotor. The fibers of different layers are aligned in different directions. When sufficient discs or billets are joined, they are configured with the requisite hub for spinning and sample tube apertures for containing samples to be centrifuged. A quasi-isotropic rotor structure results with strong properties normal to the spin axis.

Unfortunately, such rotors are relatively weak parallel to the spin axis; they can readily de-laminate at the individual layers when forces parallel to the spin axis are generated between the individual laminates of the rotor.

Composite materials have heretofore been generally unsuitable for use with so-called "fixed angle rotors." Specifically, in such fixed angle rotors the sample tubes are inserted from the top of the rotor into apertures that are angularly inclined at a "fixed angle" with respect to the spin axis. Such angular inclination usually tilts from a point of insertion of the sample tube at the top of the rotor parallel to but away from the spin axis of the rotor. Tilting is usually in the range of 5° to 30°. The bottom of the sample tube is further away from the spin axis of the rotor.

During centrifugation, the sample tube when subjected to centrifugal force exerts a force along the sample tube aperture within the rotor. This force has a component into the body of the rotor along the axis of the sample tube aperture in the rotor. In the case of a composite rotor, this force is the main cause of de-lamination.

For this reason, composite rotors have heretofore been restricted to rotors whose sample tubes are disposed parallel to the spin axis of the rotor where there is no such delaminating force generated. See for example, Piramoon et al U.S. Pat. No. 4,738,656 issued Apr. 19, 1988 entitled Composite Material Rotor; Piramoon U.S. Pat. No. 4,781,669 issued Nov. 1, 1988 entitled Composite Material Centrifuge Rotor; Piramoon U.S. Pat. No. 4,790,808 issued Dec. 13, 1988 entitled Composite Material Centrifuge Rotor; Piramoon U.S. Pat. No. 5,057,071 issued Oct. 15, 1991 entitled Hybrid Centrifuge Rotor; U.S. Pat. No. 5,206,988 issued May 4, 1993 entitled Hybrid Ultra-Centrifuge Rotor with Balancing Ring and Method of Manufacture. All of these particular rotors relate to so-called vertical tube rotors; where the tubes containing the sample are aligned parallel to the spin axis of the rotor.

In an International Application published under the Patent Cooperation Treaty on Dec. 23, 1993 entitled Fix-Angle Composite Centrifuge Rotor by Malekmadani et al., a fixed angle rotor of which I am the omitted inventor, is described. In that disclosure a fixed angle rotor with oblique windings on a conical exterior was provided. The purpose of the oblique windings is to provide a composite rotor with resistance to the forces of vertical separation generated by sample tubes in fixed angle rotors. Rotors having this configuration have been sold more than one year prior to the filing of this patent application; consequently the rotor described in this publication is prior art to this patent application.

There are two phases to fabrication of a centrifuge rotor from composite material. The first phase involves laminating a composite billet or disc as the main structural part. Lamination is done with composite tape or fabric which is laid-up and cut. Heretofore, such lamination and cutting in most cases has been done manually.

Reinforcement of rotors, either of composite construction or conventional construction, has included the winding of such rotors with tows of composite material fibers. Such windings contain as many of discrete filaments as required by the final product design.

To take full advantage of strength properties of unidirectional fiber, an appropriate amount of tension must be applied to filament tow during winding. During winding, tangential friction (similar to belt pulley type friction) causes the filament to adhere under tension to the surface about which winding occurs. This tension must be maintained after winding of the filament has occurred. Since tensioning a fiber filament over the round, angled frustum shaped surface of a fixed-angle rotor can lead to slippage of the filament, such windings have limitations.

In the International Application published under the Patent Cooperation Treaty on Dec. 23, 1993 entitled Fix-Angle Composite Centrifuge Rotor by Malekmadani et al., the disclosed choice is to compromise the tendency of such windings to slip on the frustum shaped or net shaped outer surface by utilizing oblique winding. Because of the requirement to apply fiber tension over the angled surface of the rotor to gain the required vertical reinforcement, an oblique winding was used. This required the use of complex four-axis winding machines. Unfortunately, usefulness of oblique winding in rotor fabrication is limited. Oblique winding over the angular, rounded surface of an angled rotor does not permit application of sufficient filament tow tension and reinforcement. Hence, obliquely wound rotors will not be structurally strong enough for high-load, high-G force applications. Vertical slippage of the wound fibers followed by loss of fiber tension will result in separation of the laminates of the rotor under moderate levels of load and forces. For this reason, this technique has limitations.

Other approaches of reinforcement against forces of vertical separation have been suggested. These approaches include braiding/molding and compression foam molding combinations. While these techniques may be suitable for lower speed, lower G-force centrifuge applications, their usefulness has distinct limitations. These limitations include difficulty of application and manufacture as well as failure under high G loads such as those encountered in ultra speed centrifuge rotors.

DISCLOSURE NOT PRIOR ART

In an Application entitled Automatic Lay-Up Machine for Composite Fiber Tape, patent application Ser. No. 08/249,502, filed concurrently herewith on May 26, 1994, I disclose the lay-up of such discs or billets by automated means. Accordingly, this reference is incorporated herein as if set forth in full.

The disclosure in this reference can be summarized as follows:

An automatic lay-up machine is disclosed for composite material article having anisotropic resistance in tension. A layer of fiber material, either unidirectional or fabric weave, is dispensed between a supply roll and a take-up roll. This material is advanced over a cutting table having at least one and preferably a plurality of cutting molds, each mold cutting a profile of a portion of an article being fabricated and leaving a continuous scrap webbing for gathering at the take-up roll. The material is placed under tension across the cutting table, compressed, and cut at the molds to extract the individual layers having the desired sections utilized in fabricating the article. This process is repeated with the molds indexing in rotation with respect to the material so that successive layers filling the molds align their respective fibers in varying directions. Sufficient scrap material is left between the cutting table and the take up roll that tension can be drawn through the un-severed fiber sections as material is sequentially advanced across the cutting table. Where pre-impregnated composite unidirectional tape or fibers are used, refrigeration of the supplied tape with following adhering to form a unitary article or article part occurs. Alternately, built up layers of composite fibers without resin can be impregnated with resin. This article or article part is then cured as a unitary mass. Such curing can occur in either the original cutting mold or in a special curing mold to which the accumulated fibers are transferred for curing. Upon cure, clean up machining of the article or article part can occur with separate article parts later being joined to form the finished article.

SUMMARY OF THE INVENTION

A fixed angle rotor and method of manufacture of a fixed angle rotor is described in which a frustum shaped rotor having rounded surfaces is reinforced by filament tow windings against both vertical and horizontal forces generated during centrifugation. A so-called "high speed" rotor is disclosed having a bottom composite disc, a top composite disc, and a frustum shaped hollow fiber-reinforced molded insert between the respective discs having a stepped exterior surface. An "ultra speed" rotor is also disclosed having a bottom composite disc, a top composite disc, and composite discs there between defining a stepped exterior surface. In both cases, these exterior steps have surfaces which capture the windings to the exterior of the rotor. A first class of individual fiber windings about the rotor are applied having a vertical reinforcement component parallel to the spin axis and normal to the laminate layers. These windings include either vertically disposed loops in grooves on the stepped exterior of the rotor which tie the top and bottom discs together (with the remainder of the rotor securely sandwiched therebetween) or vertically disposed windings in exterior grooves which extend over both top and bottom discs of the rotor. A second class of windings includes circumferential windings on the step surfaces of the rotor. Such windings are applied to fill in the stepped surfaces as well as to resist centrifugal forces of centrifugation. All windings are applied under tension and remain under tension as applied to the rotor. Fixed angle composite rotors wound in a similar manner have superior resistance to forces causing delamination.

It is the primary object of this invention to describe simple methods of reinforcement for composite centrifuge rotors using simple, inexpensive winding machines. The key advantage of this invention is that the method makes it possible to exert maximum allowable tension on filament tow and adequate reinforcement demanded by a particular rotor's design criteria.

The invention also describes a sample holder which resists the de-laminating vertical forces. Specifically, the top of the rotor sample aperture is provided with an enlarging female annulus. Likewise, the sample tube holder is provided with an enlarging and complimentary male annulus. As a result, vertical forces on the sample tube holder relative to the rotor are directed from the top of the sample tube aperture vertically downward in compression onto the rest of the rotor. Localized vertically disposed forces tending to de-laminate the rotor is avoided.

This invention also provides a means to better address handling problems associated with large-volume, high speed centrifuge rotors. These rotors, currently made from aluminum, weigh as much as 60 pounds and pose serious back injury risks. Even composite equivalents of these rotors, weighing 30–40 pounds will not significantly lower the risks of personal injury.

The method described in this invention includes a process with two laminated plates and a spacer (in the form of a reinforced, truncated compression-molded cone) held together by means of circumferential step and angled hoop winding. With this "dual plates and spacer" design, the weight of a 60 pounds aluminum rotor could be reduced as much as seventy percent (70%) to 15–18 pounds with no compromise to its performance. Further, the weight of the rotor is only about 60% of the equivalent aluminum rotors. Moreover, overall strength of the finished rotor is higher than the equivalent titanium rotor.

The process requires simple winding on an angled surface by means of circumferential step winding, circumferential vertical winding or angular hoop winding. Complex, multi-axis windings and machines for generating such windings are not required. Consequently, the fabrication approach described in this invention eliminates the need for expensive, complex or labor-intensive capital equipment.

Further, the rotor designs here disclosed can conveniently be used with composite plates produced by my Application entitled Automatic Lay-Up Machine for Composite Fiber Tape, patent application Ser. No. 08/249,502, filed concurrently herewith on May 26, 1994, in which I disclose the lay-up of such discs or billets by automated means. Since the manufacture of these discs is automated, the machine there disclosed will facilitate mass production of composite centrifuge rotors at a cost structure lower than their metallic counterparts.

The process of manufacture and the resulting rotor article permits full utilization of strength properties of inexpensive unidirectional composite tapes, thus eliminating (but not excluding) the need for designs with braids or woven fabric or chopped fiber.

When combined with a novel resin transfer molding finish for the outer surface, the invention permits use of dry fibers which further simplify the fabrication process and reduce cost. In addition, laminated centrifuge rotors wound with dry fibers may be produced in larger batches and stored at room temperature indefinitely. At the end of the storage, the wound and partially completed rotors can be impregnated with resin, cured, and finished. Thus, it can be understood that the resin transfer molding eliminates the need to utilize resin pre-impregnated fibers which typically require refrigerated storage and curing in a relatively short period after lay-up of discs.

The invention includes a novel resin transfer molding device that contains integral multiple heater and multiple resin injection port design. The molding device is used to provide a smooth, aerodynamic, cosmetically pleasing surface and the smallest profile for the rotor to achieve the best possible performance.

For the production of the high speed rotor, to reduce weight and increase ease of handling, this invention describes a method of fabrication using a spacer, such as a reinforced, compression-molded truncated cone, sandwiched and held between two composite plates. This method of fabrication will eliminate as much as thirty percent (30%) of the composite material, further reducing cost and weight of the resulting rotor.

This invention describes fabrication of rotors with sample holders. The sample holders may be made of composite or metal. Lipped sample holders may be removable or permanently fixed. Removable sample holders may be open-top or individually sealed with a cap. This disclosure gives cost and performance trade-offs between different step winding choices and sample holders which provide the engineer a range of design approaches to better meet cost, strength and performance requirements.

Lipped and capped removable sample holders provide a means to better implement bio-containment which is an important feature for handling mixtures containing biohazardous material such as toxic compounds or live viruses like HIV. In such cases, if the bottle containing the sample mixture leaks during centrifugation, all material will be contained in the sample holder, sparing the rotor and the centrifuge. Handling and decontaminating sample holders will be considerably simpler, shorter, safer and less expensive than dealing with contaminated rotor and/or centrifuge.

A rotor fabricated from composite material will be significantly safer because of its failure mode. While spinning, composite rotors fail very differently than metal rotors and the resultant pieces, being smaller and of lower density than aluminum or titanium, will transfer far less energy to the centrifuge and cause less damage. Subsequently, future centrifuges designed to operate solely with composite rotors will be constructed with less expensive drives and safety-related containment features. All of these properties will result in less expensive, smaller, lighter, safer and more reliable centrifuge systems.

Under similar circumstances, a composite rotor will last longer than a metallic one. Fatigue, accelerated by stress corrosion, imposes a severe limitation on the number of hours a metal rotor can be safely used. Top speed rating of a metallic rotor, for example, is typically derated by the manufacturer, by ten percent (10%) after a few thousand hours of usage. Then, after another few thousand hours of operation at the lower (derated) speed, the product is typically retired. With characteristically lower fatigue build-up, a properly designed and fabricated composite rotor will remain corrosion free and offer a significantly longer service life at its top speed rating than both aluminum or titanium.

DESCRIPTION OF THE PREFERRED EMBODIMENT

Figure 1A:
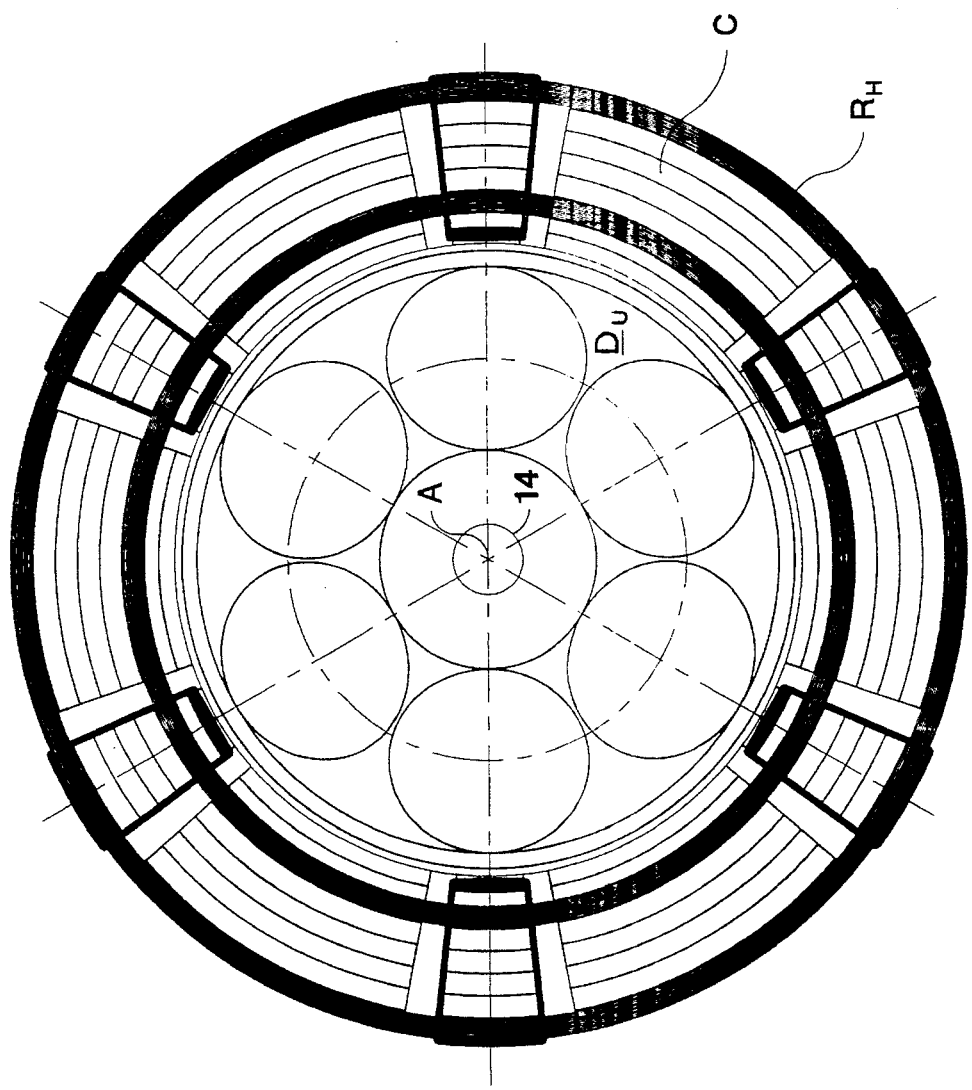
FIGS. 1A, 1B, and 1C are respective top plan, side elevation sections, and a perspective view partially broken away of a so-called high speed rotor fabricated according to my disclosure, the rotor here incorporating both vertically extending and peripheral winds for rotor reinforcement, the particular rotor shown having a cast fiber central molded frustum with stand alone sample holding tubes.
Figure 1B:
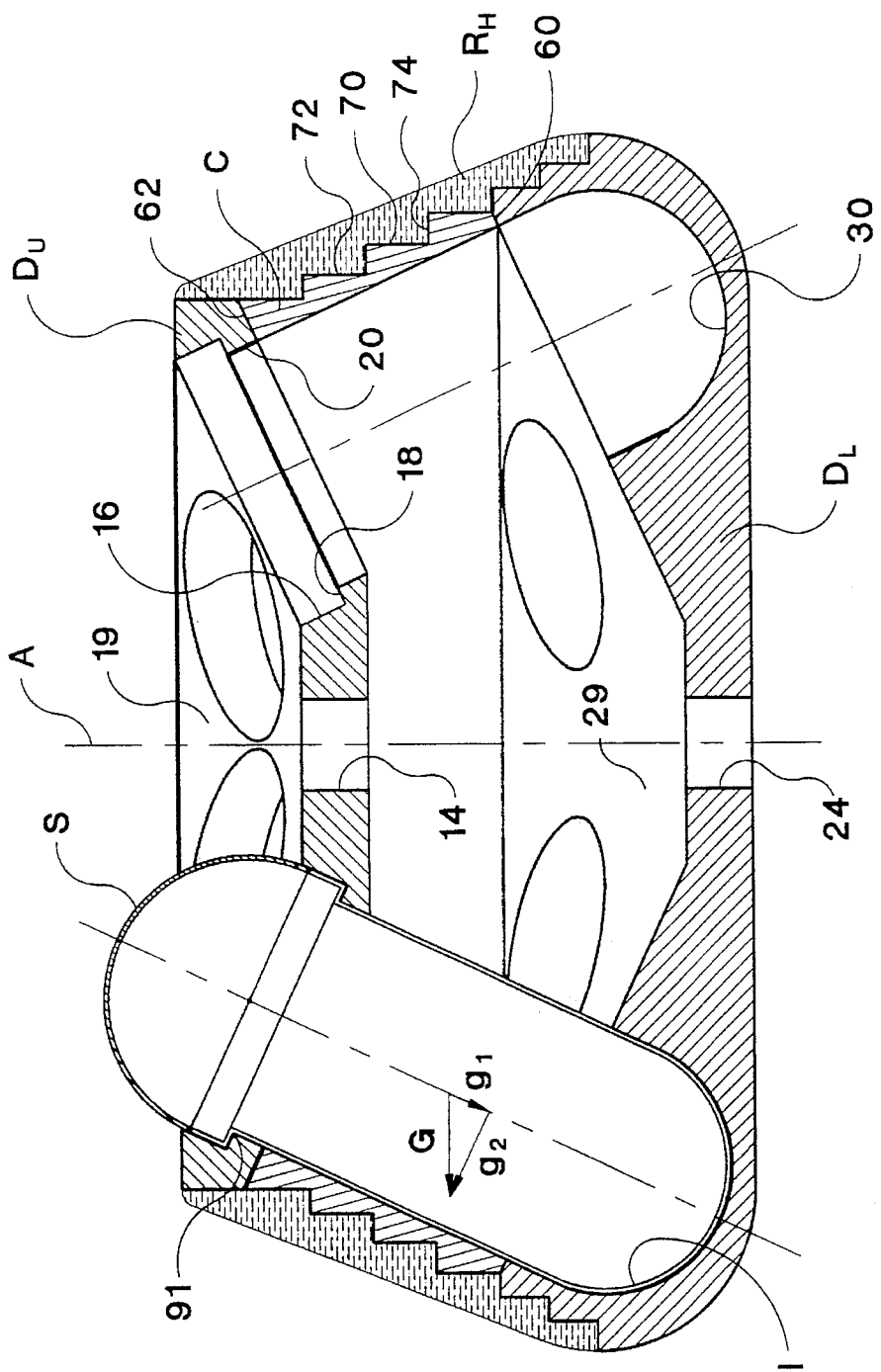
Figure 1C:
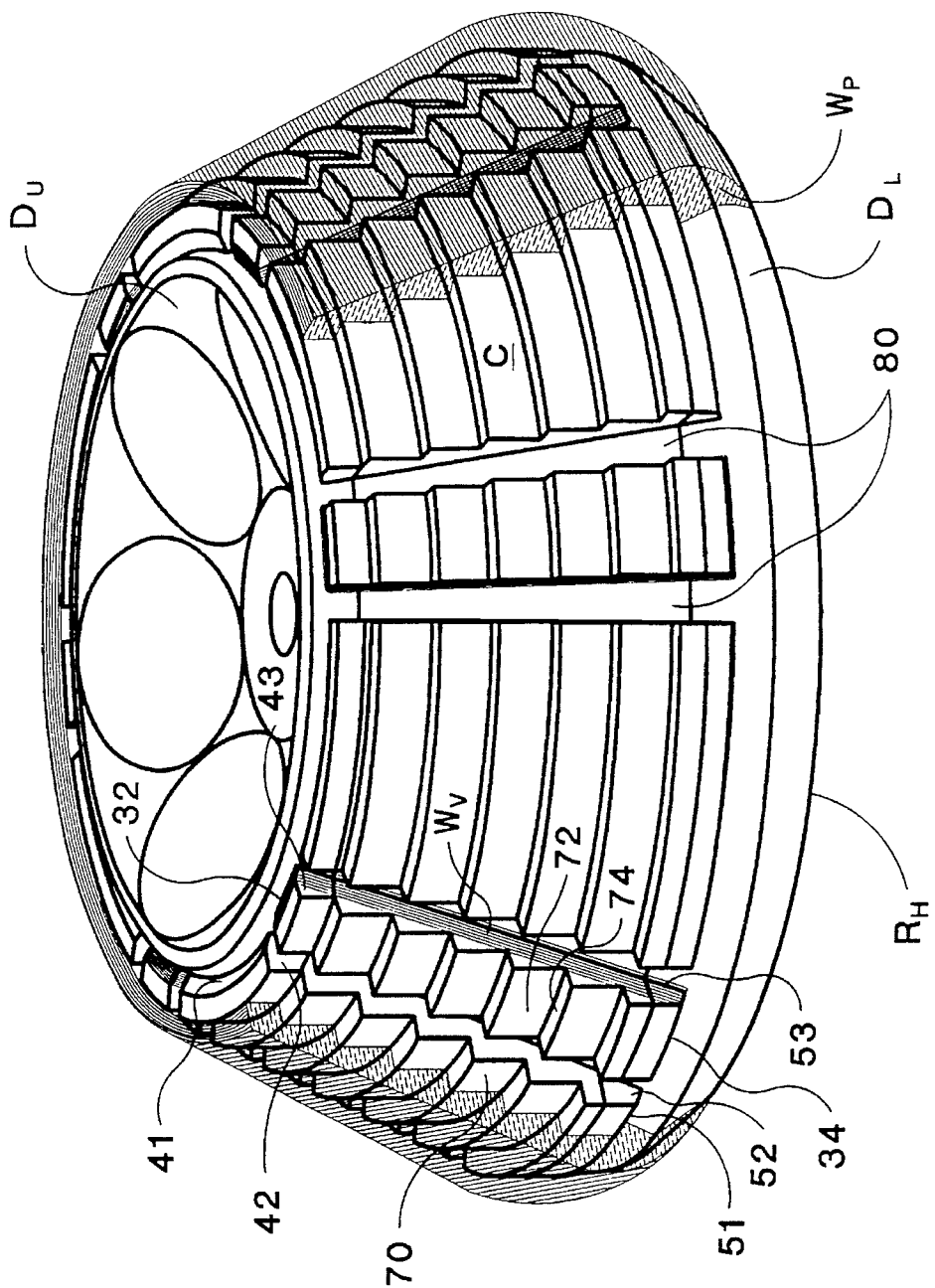

Referring to FIGS. 1A, 1B, 1C, a plan schematic, side elevation section, and perspective schematic section of a high speed rotor $R_H$ is illustrated. Before proceeding with the description of high speed rotor $R_H$, an analysis of the forces exerted by the sample tube S will be offered with respect to the section of FIG. 1B.

During centrifugation, gravitational force G is applied to a fixed-angle centrifuge rotor. This component is normal to spin axis A of high speed rotor $R_H$. When gravitational force G is applied to the inclined sample tube aperture I, the force may be broken into components to understand its delaminating forces on high speed rotor $R_H$.

In the case of the fixed angle rotor, this force will have two directional components relative to sample tube S. A first component axial to sample tube S is component $g_1$. This force tends to drive sample tube S downward and out the bottom of high speed rotor $R_H$. A second component normal to sample tube S is component $g_2$. This force tends to take sample tube S outward through the sidewall of high speed rotor $R_H$. It will be noted that this component $g_2$ has a slight upward direction. Development of a fixed-angle composite rotor demands recognition and design elements to effectively counter these forces.

The preferred method described in this invention to provide structural integrity to a laminated composite centrifuge rotor is to reinforce the laminates by means of filament winding in the simplest possible way.

Having recognized this constraint, the general construction of high speed rotor $R_H$ can now be set forth. High speed rotor $R_H$ includes an upper disc $D_U$, lower disc $D_L$ and a fiber reinforced molded cone C sandwiched between the respective discs.

Upper disc $D_U$, and lower disc $D_L$ are of composite construction. Such discs are fabricated on that apparatus disclosed in my co-pending Patent Application entitled Automatic Lay-Up Machine for Composite Fiber Tape, patent application Ser. No. 08/249,502, filed concurrently herewith on May 26, 1994. Specifically, layers of composite material reinforced by either uni-directional composite fiber or bi-directional composite fibers are formed into generally disc shaped billets by being placed one on top of another, debulked, impregnated with resin, and cured to form quasi-isotropic composite material discs.

Figure 2A:
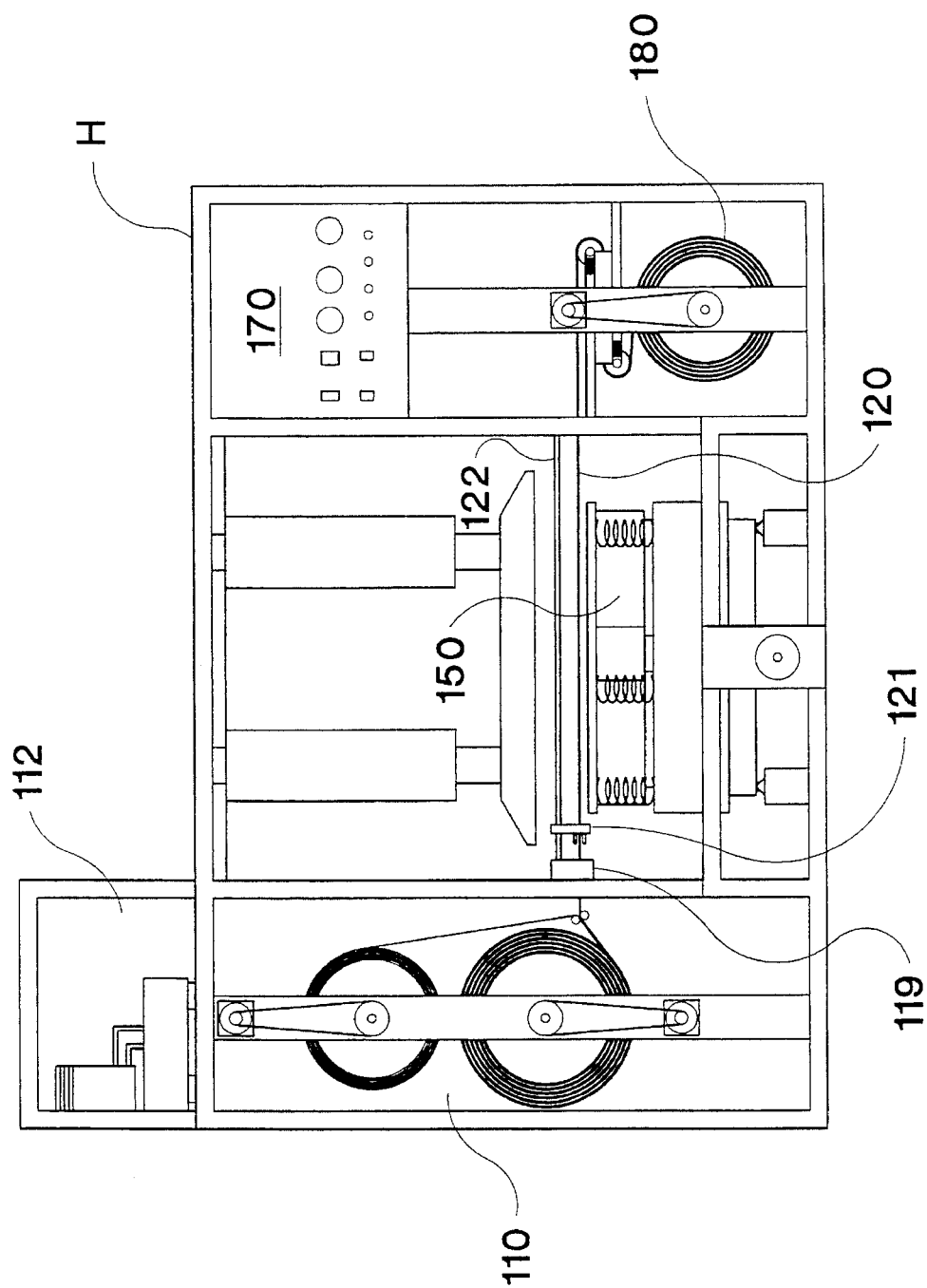
FIGS. 2A and 2B are respective a side elevation sections and plan views of an automatic lay-up machine taken from my co-pending Automatic Lay-Up Machine for Composite Fiber Tape, patent application Ser. No. 08/249,502, filed concurrently herewith on May 26, 1994, illustrating the fabrication of discs for use in a composite rotor.
Figure 2B:
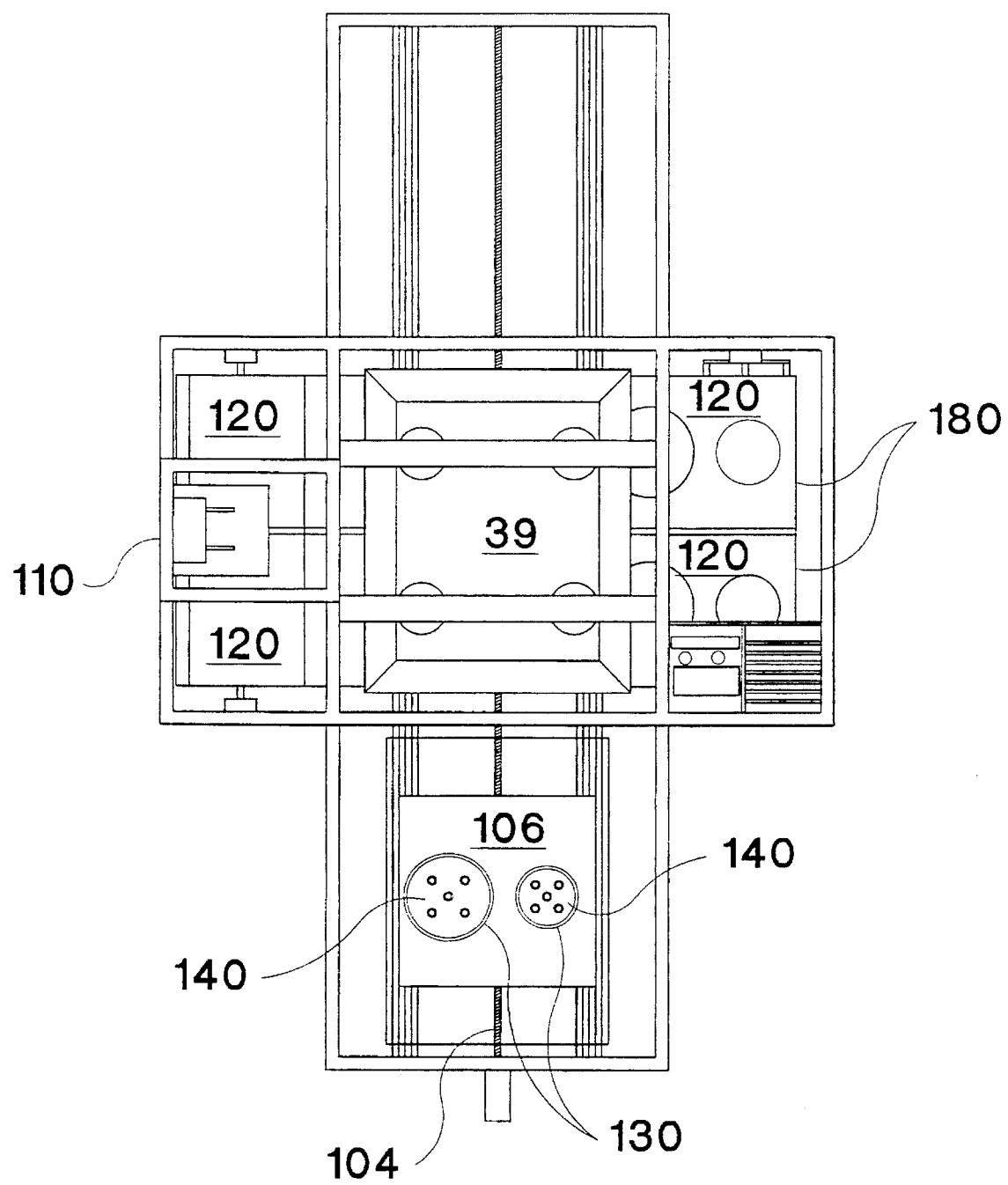

In order to spare the reader laborious cross reference, a summary of the operation of the apparatus described in my above referenced Patent Application is offered with respect to FIGS. 2A and 2B.

Referring to FIGS. 2A and 2B, the automatic lay-up machine of this invention is set forth. A unitary frame H connects the discrete components together. These components include a feeder/separator mechanism 110 which has a communicated air conditioner/dehumidifier unit 112. Solenoid housing and encoder unit 119 causes sequential intervals of material 120 to be sequentially advanced, stopped for cutting, and thereafter advanced again.

It is required that during the cutting step, material 120 be held under tension. This occurs through a carrier/tensioner mechanism 121 acting on support 122.

Presuming that material 120 is positioned under tension, die cutting and punching mechanism 130 causes individual laminates to be cut from material 120 under tension. Upon cutting, each of the laminates passes to debulking and compacting mechanism 140. In the embodiment here, this is shown to be the interior of die cutting and punching mechanism 130. The reader will understand that such materials can as well be debulked and compacted in apparatus separate from the illustrated apparatus.

When such compacting and debulking occurs, in the case of pre-impregnated material 120, adhesion occurs. In the case of material 120 which is fabric that is not impregnated, debulking and compacting mechanism 140 serves to compress the layers for later resin injection and curing.

Indexing mechanism 150 controls rotation of die cutting and punching mechanism 130. This drive and indexing mechanism 150 causes programmed rotation of the dies with respect to material 120 after each respective cut. When it is remembered that material 120 has composite fibers aligned with respect to the material—usually parallel to and sometimes both parallel to and normal to the direction of conveyance—indexing of die cutting and punching mechanism 130 causes the fibers of successive layers to have differing alignments. As will hereafter become more apparent in the rotor examples contained herein, such differing alignment between differing layers will impart quasi-isotropic resistance to centrifugal spin with respect to the finally assembled article.

Controller housing unit 170 contains conventional solid state controllers—which controllers will hereafter be set forth.

Scrap spool and tensioner mechanism 180 provides a measured tension force on material 120 at the time that it is cut. Further, since die cutting and punching mechanisms 130 are spaced so as to leave a scrap webbing sufficient to transmit tension to the newly advanced segment of material 120. This will be further discussed hereafter.

Referring briefly to FIG. 2B, transverse motion mechanism 160 for the die plate is present. This mechanism is available for transport of die cutting and punching mechanism 130 from the cutting table to enable debulked laminates to be further processed.

It will further be noted that in FIG. 2B, two separate strips of material 120 are illustrated. It will be understood that differing laminate layers may be provided should design constraints so require.

Once the respective discs are formed, some machining may be required. Upper disc $D_U$ in FIG. 1B is provided with spindle hole 14 and sample tube aperture 20. It will be understood that it is a preferred feature of this invention that sample tube aperture 20 include a female annulus 18. Accordingly, partial bore 16 is made so as to define female annulus 18.

Lower disc $D_L$ must be similarly machined. This machining includes lower spindle hole 24 and lower sample tube bore 30.

In the case of both upper disc $D_U$ and lower disc $D_L$, it will be noted that concave upper surface 19 on the upper disc and a concave upper surface 29 on the lower disc are provided. This concave configuration can be provided by shaping individual laminate layers prior to curing—or alternatively by machining of discs or billets to achieve the required configuration.

It will be seen during the subsequent discussion that it is highly desirable to include vertical component windings $W_V$. These windings in FIG. 1C must key to disc step 32 at upper disc $D_U$ and to disc step 34 at lower disc $D_L$. The machining of these respective steps 32 and 34 can readily be understood.

Upper disc $D_U$ has conical surface 41 machined therein. This surface is normal to the slope of fiber reinforced molded cone C. Further, at selected angular intervals, slot 42 and slot 43 are machined in upper disc $D_U$. Together, disc step 32 is defined on upper disc $D_U$.

Lower disc $D_L$ includes analogous machining. Lower disc $D_L$ has conical surface 51 machined therein. This surface is again normal to the slope of fiber reinforced molded cone C. Again, at selected interval—matching the intervals of slots 42 and 43, slots 52 and 53 are placed. This defines the disc step 34 on lower disc $D_L$.

It is preferred that vertical component windings $W_V$ be disposed opposite each sample tube S. Accordingly, six slots 42 and 43 are on upper disc $D_U$ and six slots 52 and 53 are on lower disc $D_L$.

Having set forth the construction of the upper and lower discs in FIG. 1B, the construction of fiber reinforced molded cone C can now be set forth. Cone C is hollow, frustum shaped, and extends from base 60 to truncated apex 62. Base 60 fits to lower disc $D_L$. Apex 62 fits to upper disc $D_U$. Naturally, when fitted to fiber reinforced molded cone C, sample tube aperture 20 in upper disc $D_U$ is registered overlying lower sample tube bore 30 in lower disc $D_L$.

The exterior of fiber reinforced molded cone C is configured with steps 70. Steps 70 include winding retaining surface 72 which is here shown parallel to spin axis A. Additionally, horizontal surface 74 which is here shown disposed normal to spin axis A provides an inward increment. Steps 72 have an overall conical profile, matching the profile of fiber reinforced molded cone C. Finally, in FIG. 1C vertical grooves 80 are provided. These vertical grooves 80 run from the sides of disc step 32 on upper disc $D_U$ to the sides of disc step 34 on lower disc $D_L$.

The reader will appreciate that the step configuration accommodating vertical component windings $W_V$ and peripheral step windings $W_P$ can be varied. Taking the case of steps 70 it will be realized that the precise vertical alignment of winding retaining surface 72 is not required. Such a surface could be angular and slope, so long as windings cannot loosen and are more towards spin axis A. Likewise, it is not required that horizontal surface 74 be precisely horizontal. Again, these surfaces can have slope so long as peripheral step windings $W_P$ cannot loosen and move towards spin axis A.

Having set forth the construction of the discs and cone of high speed rotor $R_H$, attention can now be given to the winding of high speed rotor $R_H$.

The tensioning of filament tow on the angled surface of a fixed-angle centrifuge rotor is impossible due to slippage. However, using the pre-fabricated fiber reinforced molded cone C, circumferential step windings are easily placed. The reader can understand that with steps 70, it is possible to wind fiber reinforced molded cone C with adequate tension to address the most demanding design criteria. Such a winding firmly supports the rotor core against component $g_2$ of the gravitational force.

Figure 3A:
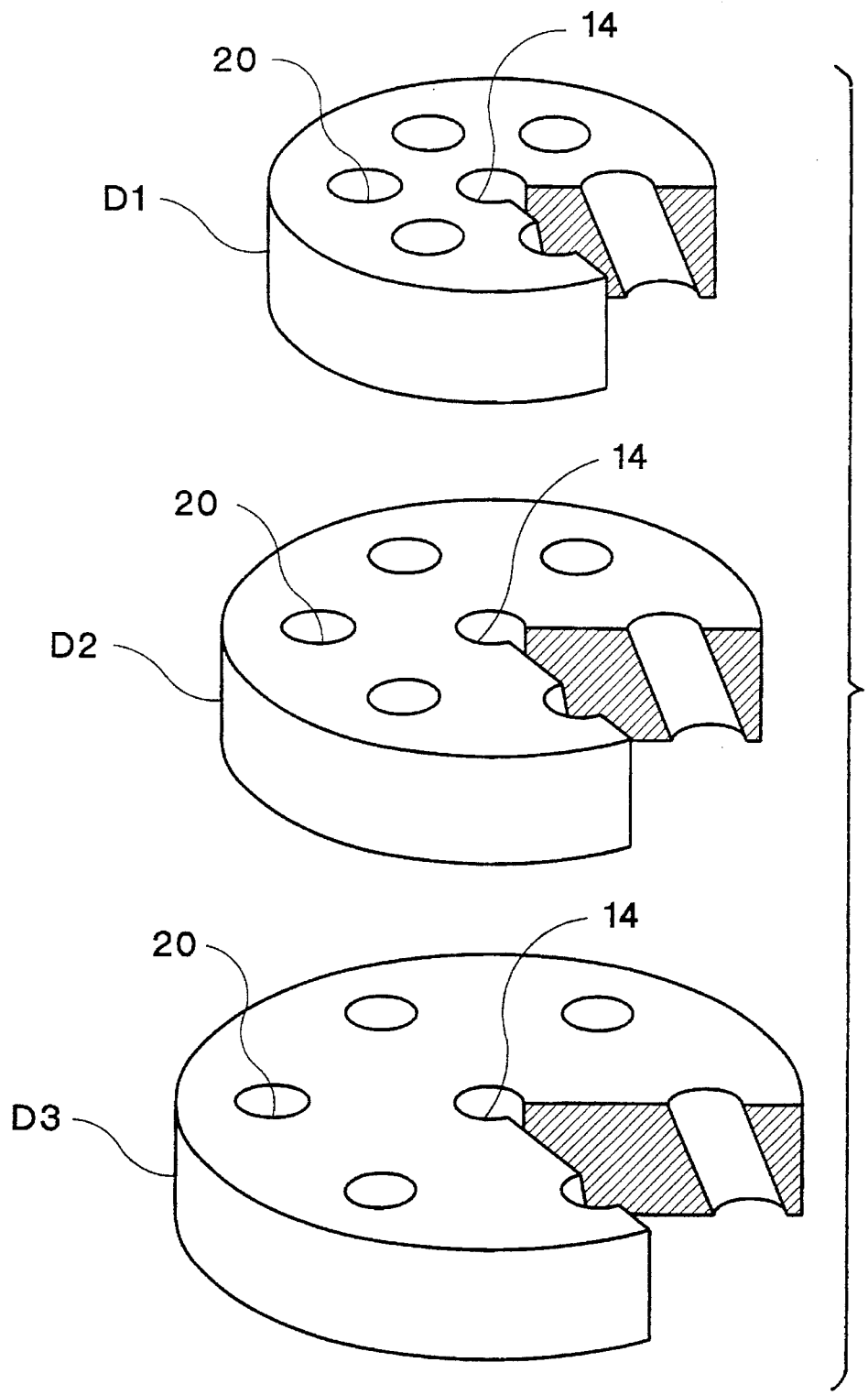
FIG. 3A is a perspective view of three composite rotor sections before placement one on another for the fabrication of a solid so-called ultra speed rotor.
Figure 3B:
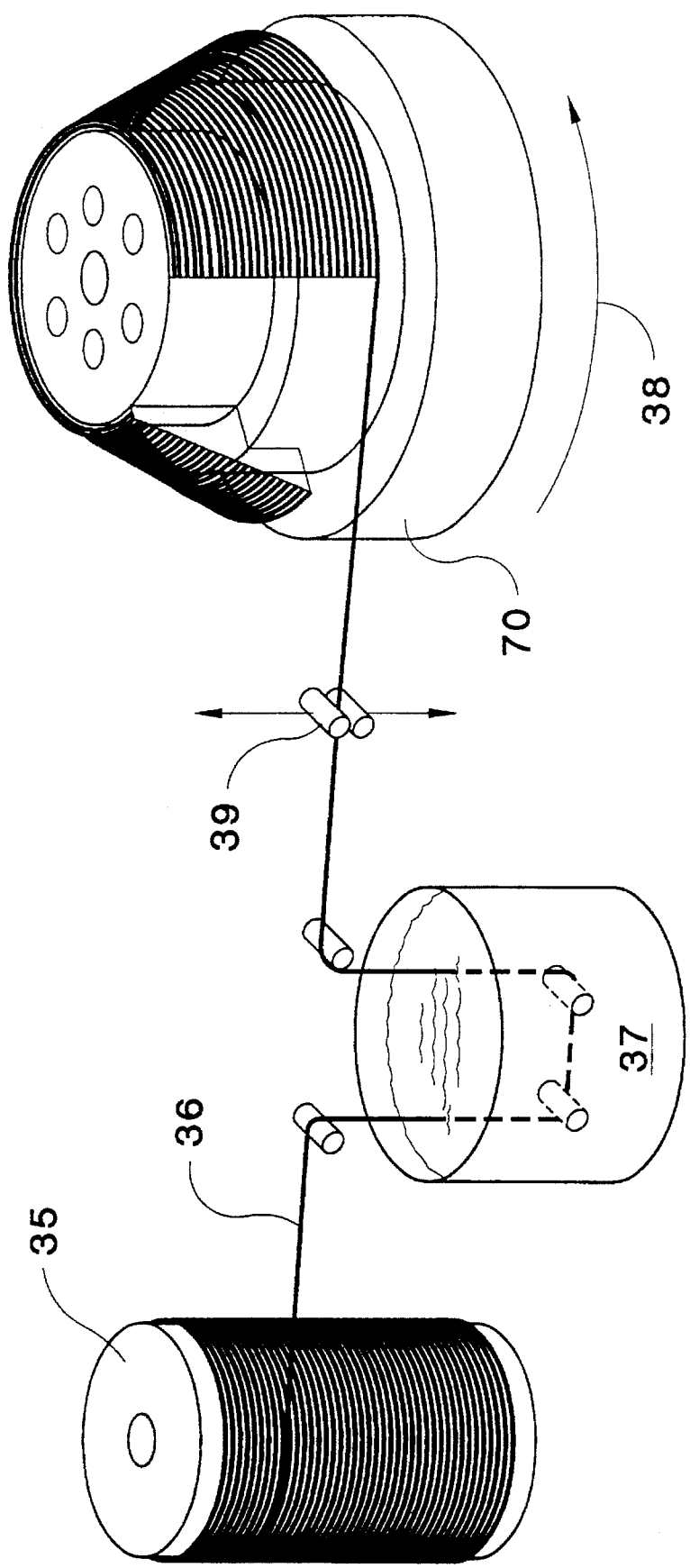
FIG. 3B is a schematic illustrating the winding of a peripherally disposed band on the exterior surface of the assembled rotor sections of FIG. 3A.

Referring to FIG. 3B, a schematic of such windings being placed is illustrated. It is known that such windings must be made under tension. Specifically, spool 35 dispenses multi-filament fiber tow 36 with tow 36 being routed to resin 37. Thereafter, multi-filament fiber tow 36 is wrapped peripherally around steps 70 in peripheral step windings $W_P$.

Control of the placement of peripheral step windings $W_P$ occurs through schematically illustrated tensioning pulleys 39 and rotation of high speed rotor $R_H$ in rotation direction 38 against the tension applied to multi-filament fiber tow 36. Such tensioned peripheral step windings $W_P$ will create optimum interferences between the core and the wound filament, thus eliminating the destructive effect of the g2 force component of gravity.

As previously set forth, when exerted directly on the plates, downward gravity force component $g_1$ will be primarily responsible for destructive separation of layers on the weakest plane of laminates, that is normal to the plane of the laminates. Vertical component windings $W_V$ provide resistance against this vertical component $g_1$.

Figure 3C:
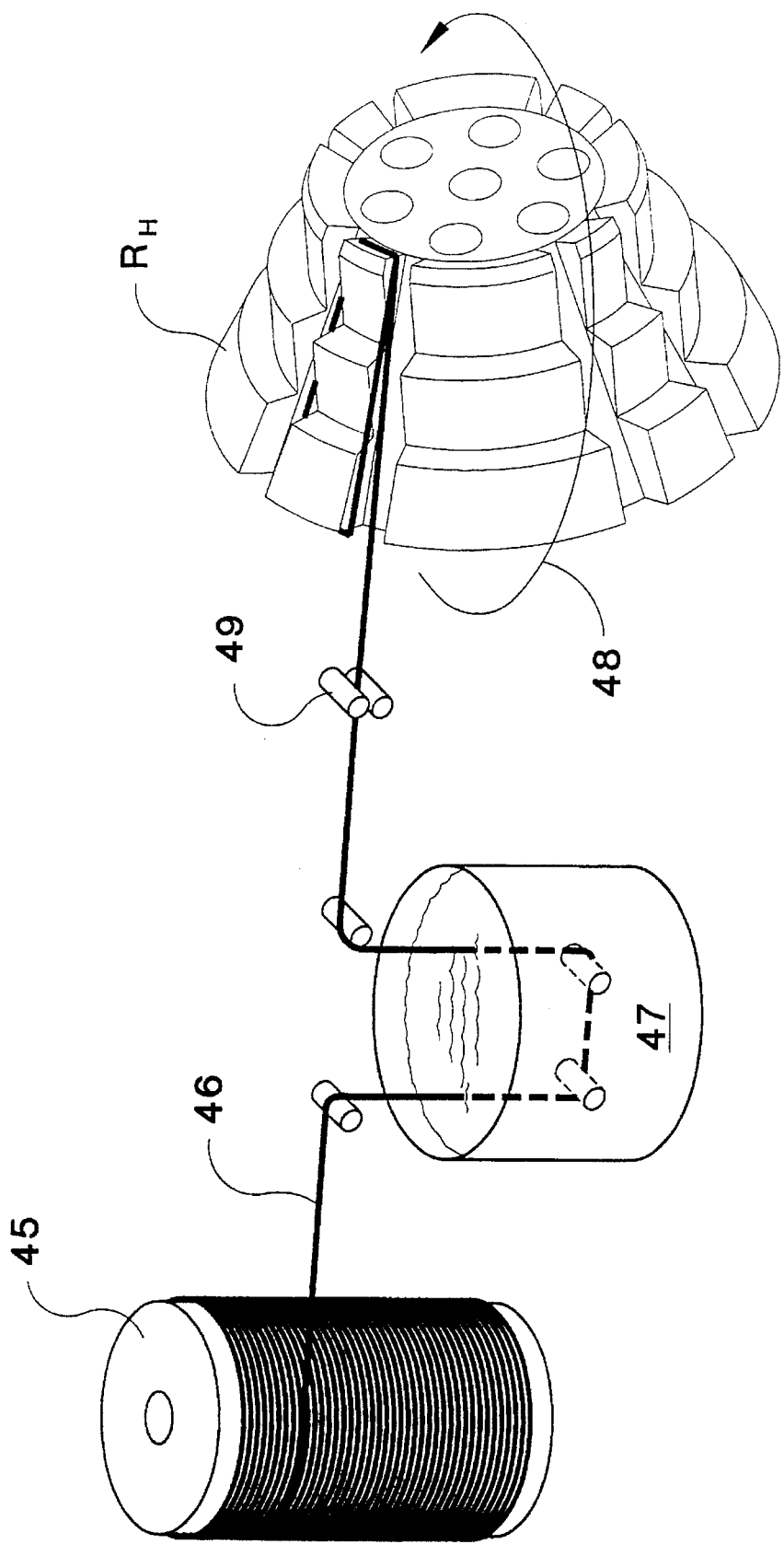
FIG. 3C illustrates a vertical wind being placed on the rotor segments of FIG. 3B, this wind extending over the vertical winds illustrated in FIG. 3B.

Referring to FIGS. 3C and 1C, a schematic of such windings being placed is illustrated. It is known that such windings must be made under tension. Specifically, spool 45 dispenses multi-filament fiber tow 46 with tow 46 being routed to resin bath 47. Thereafter, multi-filament fiber tow 46 is rapped peripherally around disc step 32, disc step 34, and vertical grooves 80 extending therebetween in vertical component windings $W_V$. Control of the placement of vertical component windings $W_V$ occurs through schematically illustrated tensioning pulleys 49 and rotation of high speed rotor $R_H$ in rotation direction 48 against the tension applied to multi-filament fiber tow 46. Such tensioned peripheral step windings $W_P$ will create optimum interferences between the core and the wound filament, thus eliminating the destructive effect of the g1 force component of gravity.

Dependent upon the particular rotor design utilized, vertical component windings $W_V$ and peripheral step windings $W_P$ will be placed in one over the other. In high speed rotor $R_H$, vertical component windings $W_V$ are placed first, and peripheral step windings $W_P$.

Regarding such windings as vertical component windings $W_V$ and peripheral step windings $W_P$, the reader will understand that such winds can be placed with a multi-filament winding tow having 3,000 to 12,000 individual high tensile strength fibers.

Figure 6B:
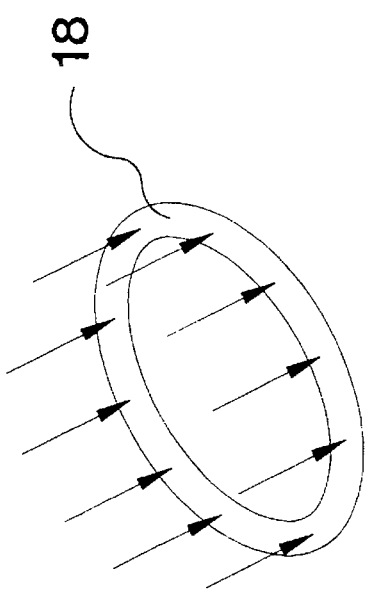
FIG. 6B is a schematic view of the small area of the top disc on which the downward force component of the sample tube holder is incident.
Figure 6A:
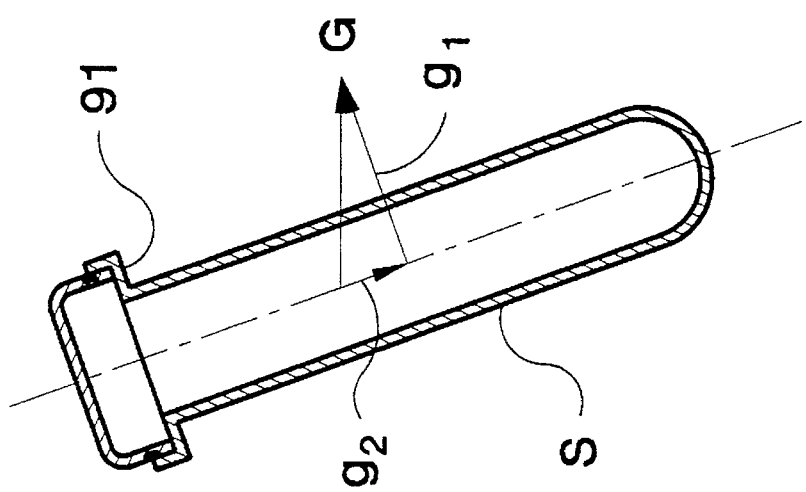
FIG. 6A is a side elevation of the sample tube holder for a fixed angle rotor, this sample holder having an expanded annulus for distributing the vertical loading force and component to the top disc as illustrated in FIG. 3A to effectively compress the rotor with vertical components generated during centrifugation.

Structural support against component $g_1$ can also be provided by incorporating lipped, removable or permanent sample holders having male annulus 91 (see FIG. 6A). Male annulus 91 will transfer the vertical component $g_1$ to the upper disc $D_U$ and distribute it over a surface area in smaller magnitude (See FIG. 6B). It is to be noted that a removable sample holder may be designed with a cap and individually sealed during centrifugation for bio-containment purposes.

The simplest means of permanently fitting open-top sample holders in rotor cavities is to secure them by applying gravitational force. The other way is to compression-fit metallic sample holders in the composite rotor cavities after sample holders are cooled to cryogenic temperatures. Due to different coefficient of expansion, metallic sample holders will permanently and securely fit into composite rotor's cavities as they reach ambient temperature (prior art: see Piramoon U.S. Pat. No. 5,057,071 of 1991, entitled "Hybrid Centrifuge Rotor").

Referring to FIGS. 3A, 3B, 4, and 5, ultra speed rotor $R_U$ is illustrated.

Looking at FIG. 3A, it will be seen that three respective rotor discs are shown including top disc $D_1$, middle disc $D_2$, and bottom disc $D_3$. These discs all include spindle hole 14 and sample tube aperture 20. It will be noted that sample tube apertures 20 are slanted. As set forth in co-pending Automatic Lay-Up Machine for Composite Fiber Tape, patent application Ser. No. 08/249,502, filed concurrently herewith on May 26, 1994, indexing of that portion of die cutting and punching mechanism 130 as successive layers of laminate are cut can cause sample tube aperture 20 to have the canted configuration illustrated in top disc $D_1$, middle disc $D_2$, and bottom disc $D_3$.

Figure 3D:
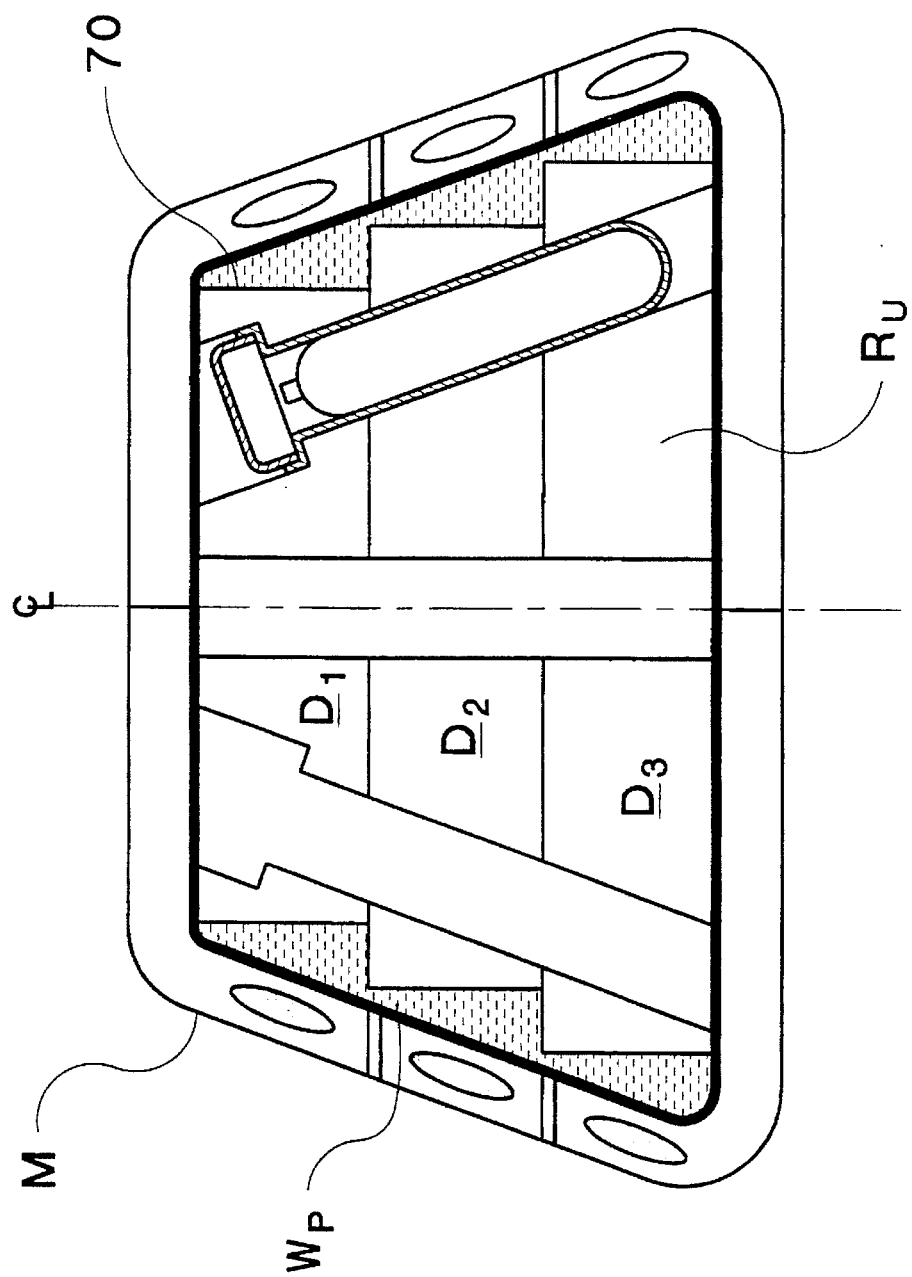
FIG. 3D illustrates the three composite rotor sections of FIG. 3A placed one upon another with a central spindle hole and sample tube apertures finished to form a fixed angle rotor, the device illustrating schematically a resin transfer injection mold for forming the outside finished surface of the rotor.

Referring to FIG. 3D, discs $D_1$–$D_3$ are shown stacked interior of resin injection mold M. It will be seen that these respective discs $D_1$–$D_3$ have steps 70 on their exterior surface. Thus, and as before a simple means to reinforce a laminated composite centrifuge rotor is peripheral step windings $W_P$. Further, with analogous machining to that illustrated with respect to disc step 32, disc step 34, and vertical grooves 80, vertical component windings $W_V$ can be added to the exterior of ultra speed rotor $R_U$. With this approach, laminated and stacked composite plates are filament-wound with full tension, circumferentially, in a vertical direction to add strength against both g1 and g2 components of the gravitational force.

In FIGS. 3B and 3C, we have illustrated respective multi-filament fiber tow 36 and multi-filament fiber tow 46 as being impregnated with resin before being wound. It should be appreciated that such impregnation with resin could as well occur after winding. Accordingly, resin injection mold M could assist in such a process. This is best seen with respect to FIG. 7.

Figure 7:
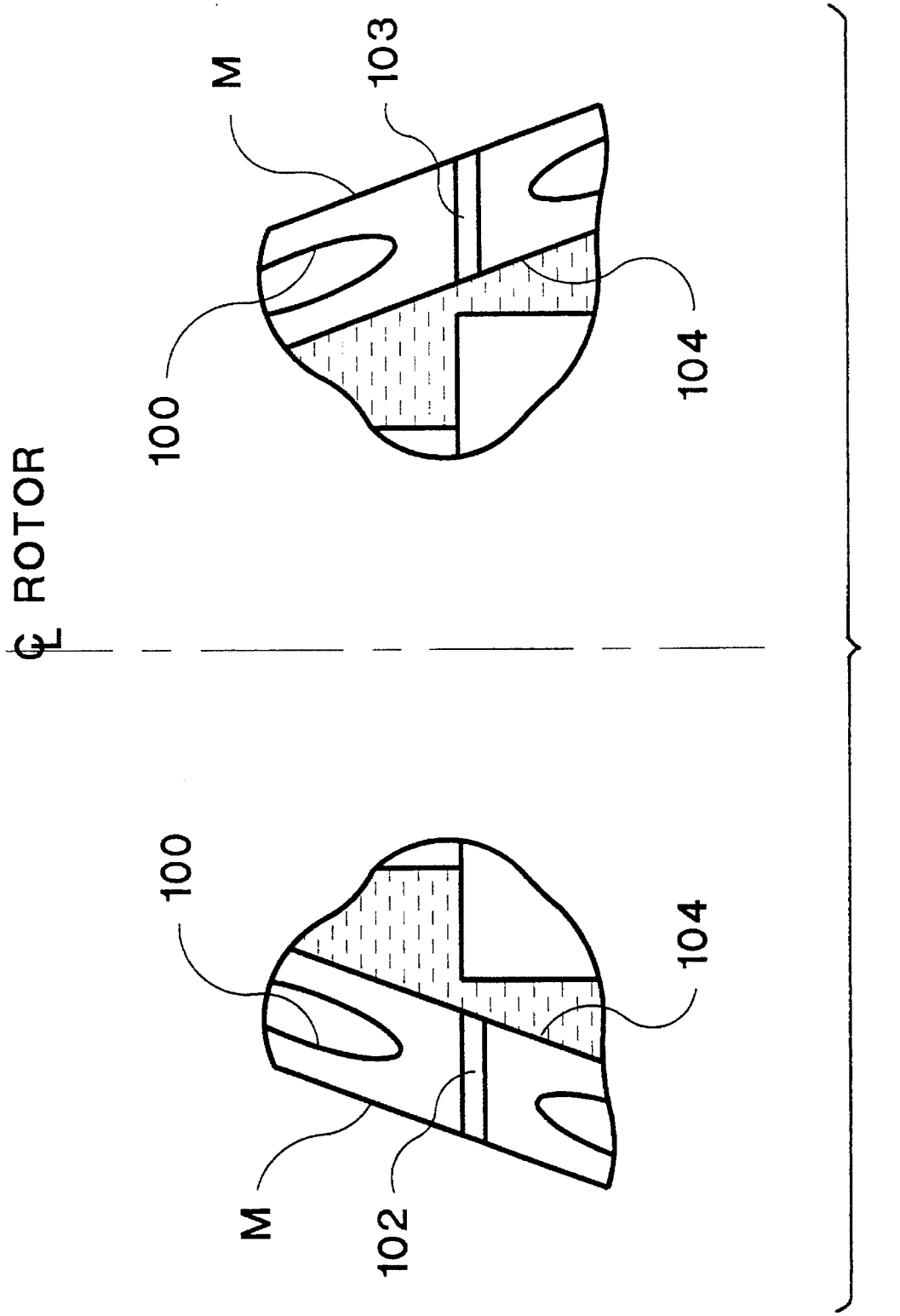
FIG. 7 is a detail of two mold portions stressing the resin flow path through the mold; and, FIGS. 8A, 8B and 8C are cartoon schematics illustrating the construction and curing of cylindrically wound and tube supports for placement in a rotor body for supporting sample tubes.

Referring to FIG. 7, resin injection mold M is shown with resin injection apertures 102 and vacuum aperture 103. In this case, peripheral step windings $W_P$ are placed free of resin impregnation. Winding can occur under tension as illustrated in FIGS. 3B and 3C with the tension wound rotors being inventoried before placement to resin injection mold M. When resin surrounds resin injection mold M and heater elements 100 are activated, resin can be thermoset causing curing of ultra speed rotor $R_U$. It will be understood that during such curing of resin, compaction during de-bulking is such that the finished rotor ends with a composition that is preferably 70% fiber and 30% resin. Further, and during the illustrated curing process, flow of resin across the rotor occurs from resin injection apertures 102 to vacuum aperture 103.

One of the key design advantages of this dual winding method is the ability to incorporate additional (secondary) tension on the vertical component windings $W_V$ by means of one simple circumferential step winding process to produce an aerodynamic product. It will be seen that peripheral step windings $W_P$ can be continued to provide a smooth frustum shape to the finished rotor. Together, circumferential step winding and vertical component will provide a simple but highly effective means to produce structurally sound centrifuge rotors that are also sixty–seventy percent (60–70%) lighter than their metallic equivalents.

The final shape and profile of a centrifuge rotor will contribute to its performance, especially if it is to be used in non-vacuum devices like the high speed or low speed centrifuges. Typically, only class of centrifuge available with a significant level of vacuum during centrifugation is the ultra centrifuge. In all cases, smooth, aerodynamic, low-windage, aesthetically pleasing profile of a rotor will enhance its performance and user satisfaction.

Figure 4:
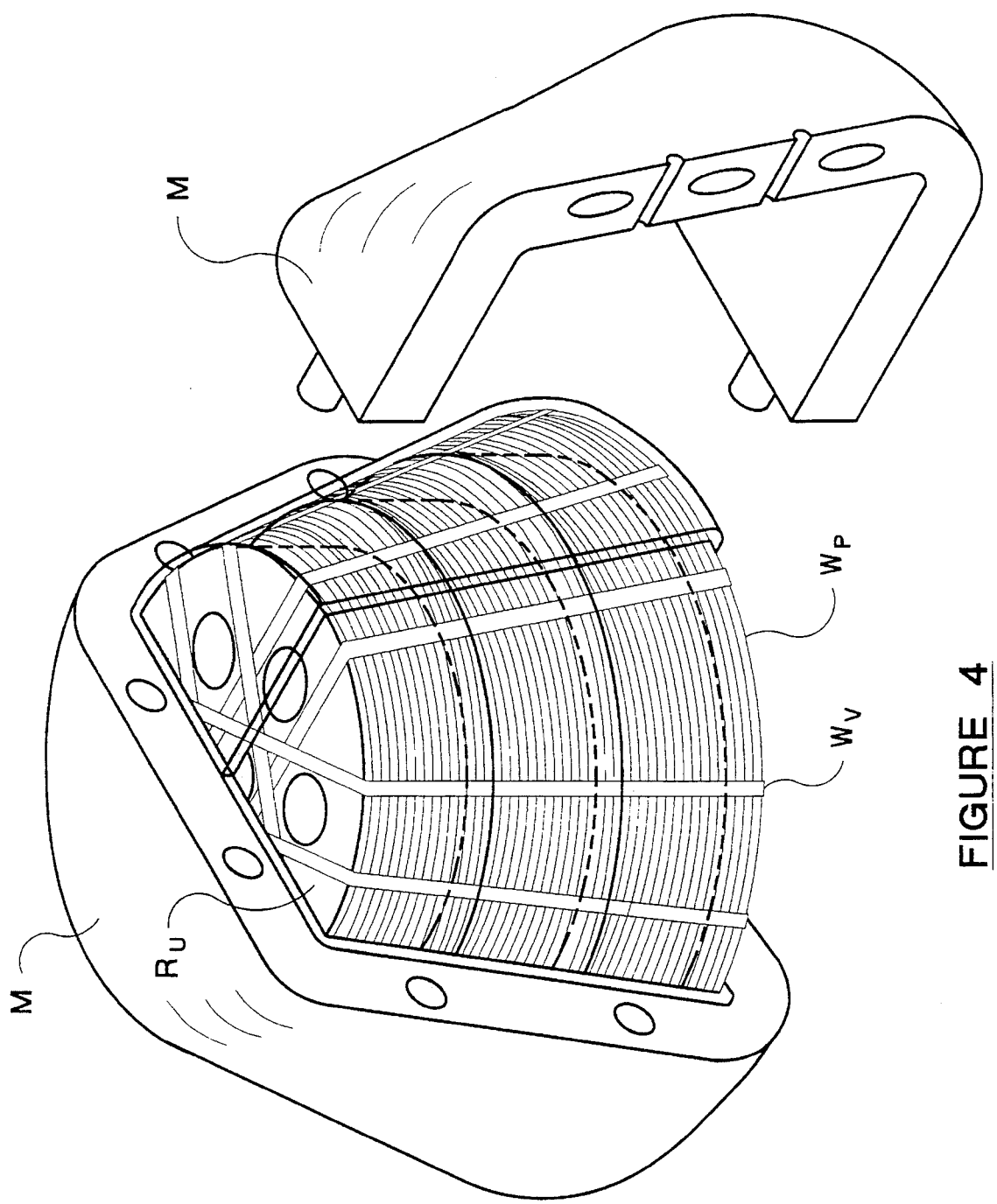
FIG. 4 is an enlarged section of an alternate rotor in a mold similar to that illustrated in FIG. 3D illustrating the resin transfer molding to otherwise dry windings of a rotor of alternate design.
Figure 5:
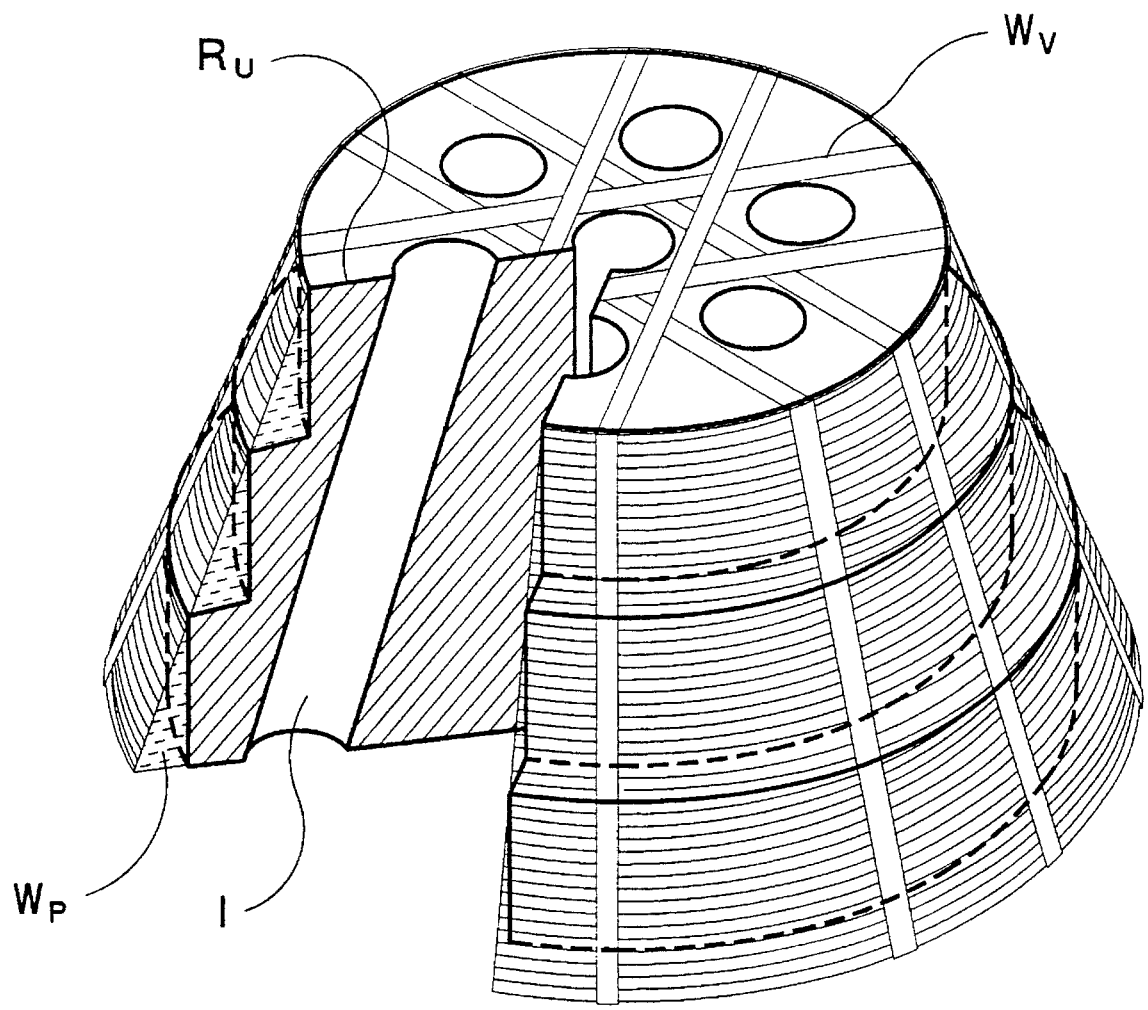
FIG. 5 is a perspective view of a rotor of an alternate design with a portion of the rotor cut away so that the construction can be fully understood.

Referring to FIG. 4 and 5, the reader will understand that winding over the top of high speed rotor $R_H$ or ultra speed rotor $R_U$ is possible. Referring to FIG. 4, eight separate vertical component windings $W_V$ are shown here on an ultra speed rotor $R_U$. Depending on the type of rotor, the size and number of cavities, and the angle of the cavities against the axis of rotation, vertical circumferential winding may be implemented in dual pairs wound at ninety degrees (90°) at each other.

Simple and straightforward, vertical component windings $W_V$ will allow full tension on the filaments and result in maximum amount of interferences between wound-fiber and rotor body, with no chance of fiber slippage. For biocontainment, vertical-wound rotors containing blind cavities may be sealed individually with removable cavity-plugs or with a rotor-lid.

Referring to FIGS. 8A, 8B and 8C, the fabrication of composite sample receiving tube supports separately by means of circumferential filament winding over a cylindrical mandrel and then cut to size as open cylinders is illustrated. Specifically, fiber tow spool 191 dispenses fiber tow 195 to resin 192. Fiber tow 195 is wound about mandrel 193 and cured. Thereafter, and as shown in FIG. 8B, tube support 194 is removed from mandrel 193. Thereafter, tube support 194 is cut to tube supports 194a–194d.

It is to be noted that these tube supports 194a–194d have a strength which cooperates with sample tubes S when placed within the tube supports. Specifically, when subjected to the forces of centrifugation, the tube support prevents radial distortion of the sample tube S. This prevention enables a rotor made with such tube supports 194a–194d such as illustrated in FIGS. 9A and 9B.

Figure 9A:
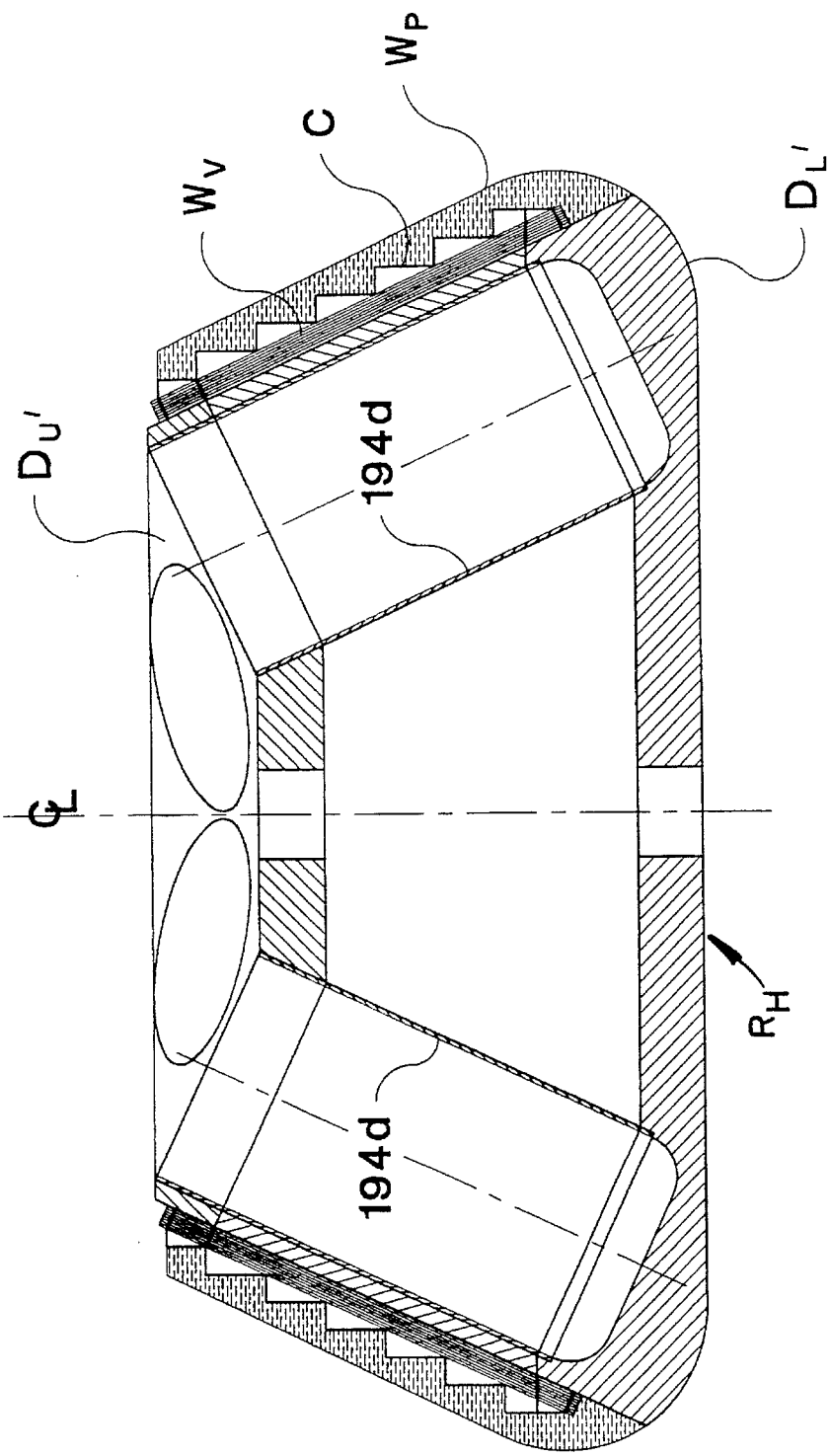
FIGS. 9A and 9B are respective side elevation section and plan view of a rotor similar to that illustrated in FIGS. 1A–1C here illustrating the fabrication of sample tube holding apertures from cylindrical wound and tube supports placed within the centrifuge body; and, FIGS. 10A, 10B, and 10C are respective perspective schematics which illustrate fabrication of the vertical windings from partially cured resin impregnated pre-wound sections.
Figure 9B:
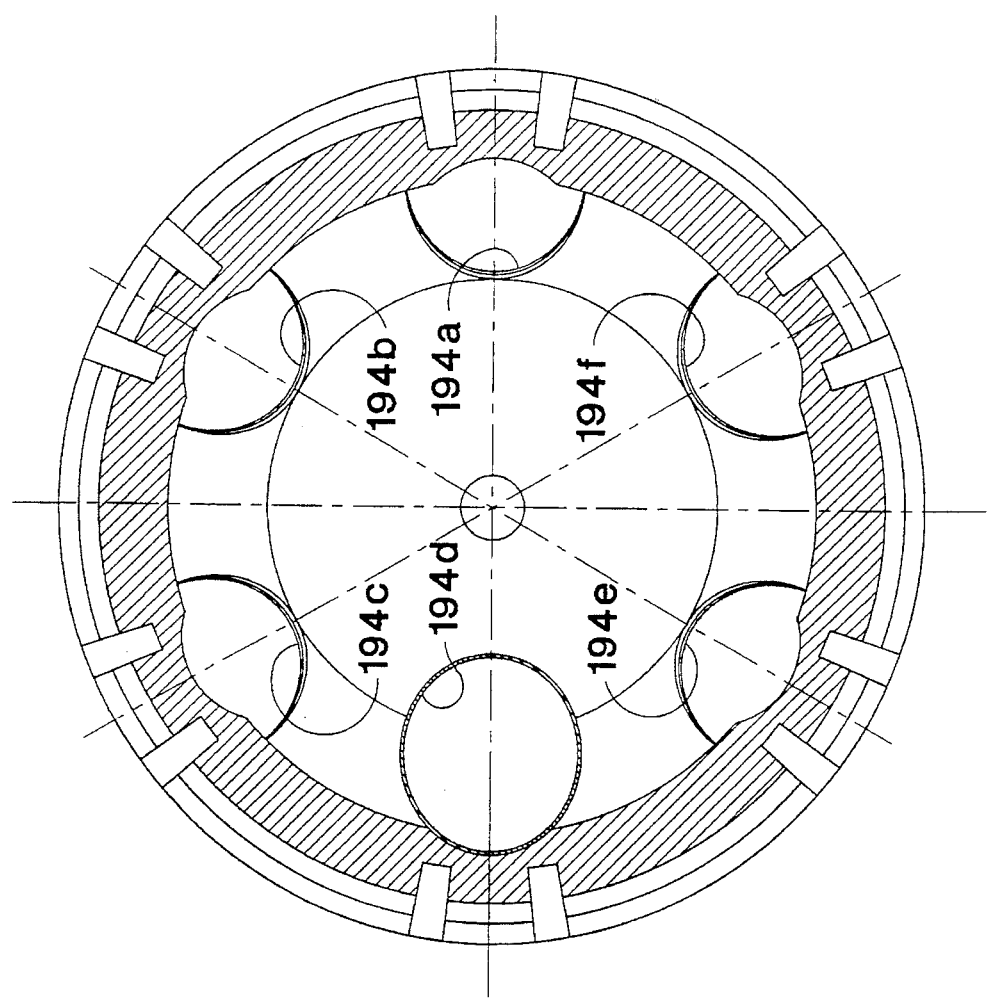

Referring to FIGS. 9A and 9B, high speed rotor $R_H$ is illustrated. As before the construction includes upper disc $D_U'$, lower disc $D_L'$ fiber reinforced molded cone C with applicable peripheral step windings $W_P$ and vertical component windings $W_V$. It will be seen that tube supports 194a–194f are placed between the respective discs and held in place by resin attachment. Once sample tubes S are placed within these respective tube supports, a composite high speed rotor having simplified construction and light weight results.

Permanent placement of these tube supports 194a–194f may be accomplished by means of adhesives, compression-fitting or a combination of both.

It will be understood that this process has advantages. Specifically, in a production environment, a large inventory of such rotors can be dry-wound and stored. Thereafter, the dry-wound and stored rotors can be resin impregnated and cured utilizing the illustrated resin injection mold M.

Figures 10A, 10B, 10C:
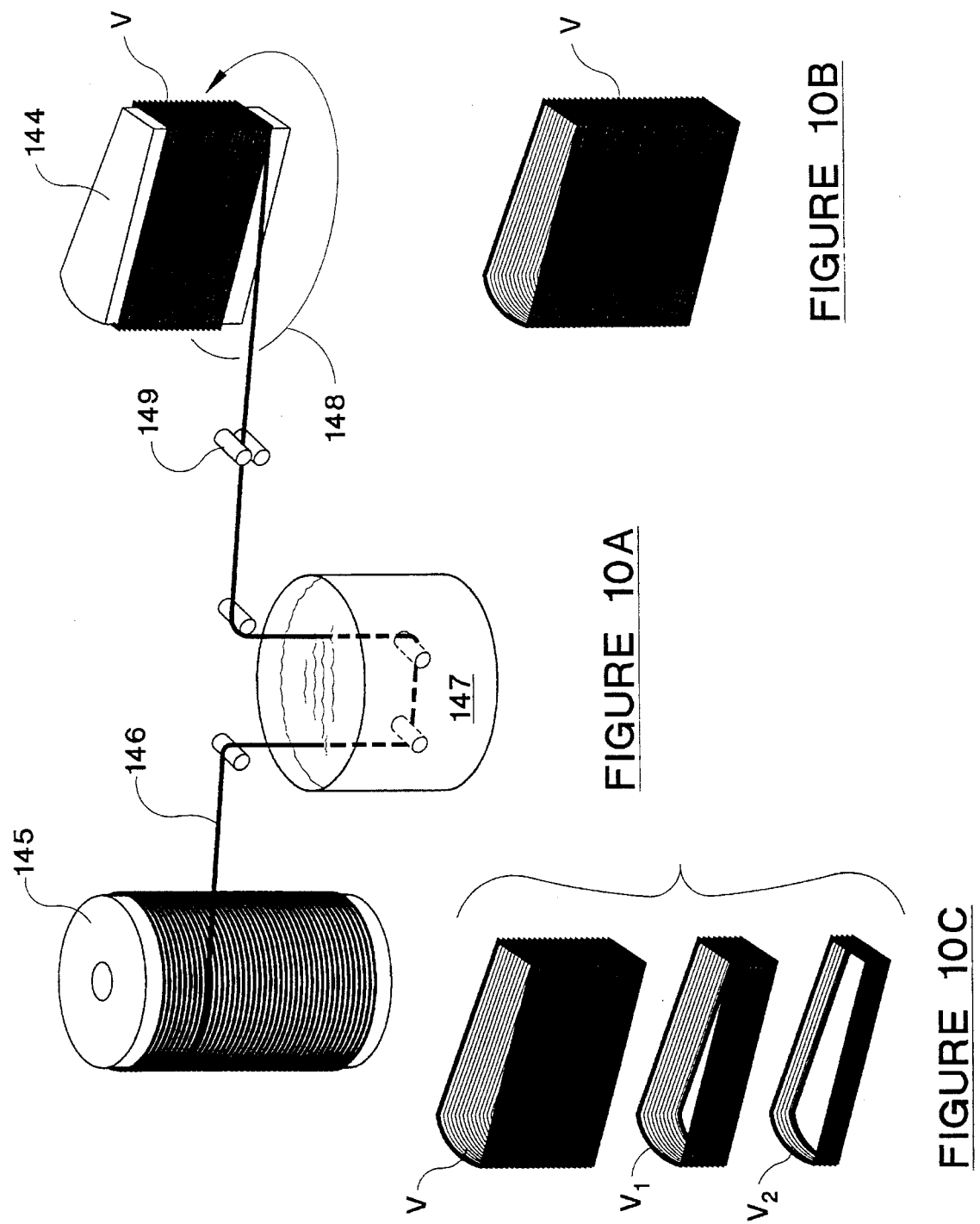

Referring to FIG. 10A, an illustration of vertical component windings $W_V$ being constructed from partially cured resin impregnated multi-filament fiber tow 146 is illustrated. Referring to FIG. 10A, fiber reel 145 dispenses multi-filament fiber tow 146 to resin bath 147 and then to guiding rollers 149. Rollers 149 cause multi-filament fiber tow 146 to be wound about vertical winding mandrel 144. Semi-cured vertical winding V results.

Referring to FIG. 10B, semi-cured vertical winding V is shown removed from vertical winding mandrel 144. In FIG. 10C, semi-cured vertical winding is cut into appropriate winding segments $V_1$ and $V_2$.

The use of these segments can be readily understood. The winding segments $V_1$ and $V_2$ have a negative expansion coefficient upon curing. There therefore can be placed about high speed rotor $R_H$ at the location of vertical component windings $W_V$ and cured. When cured they will come under tension, supplying the requisite vertical component to the rotor.

What is claimed is:

1. A composite fixed angle rotor having a frustum profile with a central spin axis and peripheral inclined sample tube apertures comprising:

a plurality of composite material discs including at least a top disc and a bottom disc, said top disc having a relatively small diameter for forming the top of said rotor, said bottom disc having a relatively large diameter for forming the bottom of said frustum shaped rotor;

each said disc having parallel and overlying laminate layers and defining said peripheral inclined sample tube apertures symmetrically distributed with respect to the central spin axis of said frustum shaped rotor, said peripheral inclined sample tube apertures symmetrically distributed with respect to said top disc being spaced radially inwardly of said peripheral inclined sample tube apertures symmetrically distributed with respect to said bottom disc;

said discs when overlying one another defining at the periphery thereof a stepped profile containing steps with respect to the spin axis of said rotor for retaining said circumferential filament windings disposed on the exterior of said rotor; and circumferential filament windings disposed about said steps normal to said spin axis, said circumferential filament windings filling said steps to impart to said rotor said frustum profile.

2. A composite fixed angle rotor having a frustum profile with a central spin axis and peripheral inclined sample tube apertures according to claim 1 and wherein:

a frustum shaped insert placed between said top and bottom discs, said frustum shaped insert defining a stepped profile on the exterior thereof; and said circumferential filament windings extending from said stepped profile containing steps defined by said top disc and bottom disc to said steps defined by said frustum shaped insert between said top and bottom discs.

3. A composite fixed angle rotor having a frustum profile with a central spin axis and peripheral inclined sample tube apertures according to claim 1 and wherein:

a step defined in said top disc of said rotor at the peripheral portion thereof having a surface for receiving a loop wind of filament having a vertical component downward towards said bottom disc;

a step defined in said bottom disc of said rotor at the peripheral portion thereof having a surface for receiving a loop wind of filament having a vertical component upward towards said top disc, said step in said bottom disc underlying said corresponding step in said top disc; and at least one vertical filament winding under tension encircling said steps for urging said top disc towards said bottom disc for resisting forces of vertical separation of said rotor.

4. A composite fixed angle rotor having a frustum profile with a central spin axis and peripheral inclined sample tube apertures according to claim 3 and wherein:

said at least one vertical filament winding is exterior to said peripheral circumferential filament windings.

5. A composite fixed angle rotor having a frustum profile with a central spin axis and peripheral inclined sample tube apertures according to claim 3 and wherein:

said at least one vertical filament winding is interior to said peripheral circumferential filament windings.

6. A composite fixed angle rotor having a frustum profile with a central spin axis and peripheral inclined sample tube apertures according to claim 1 and wherein:

said top and bottom discs have at least one disc therebetween, each said disc having a greater diameter than any disc overlying said disc and having a smaller diameter than any disc underlying said disc.

7. A process for the manufacture of a composite fixed angle rotor having a frustum profile with a central spin axis and peripheral inclined sample tube apertures comprising the steps of:

providing a plurality of composite material discs including at least a top disc and a bottom disc, said top disc having a relatively small diameter for forming the top of said frustum shaped rotor, said bottom disc having a relatively large diameter for forming the bottom of said frustum shaped rotor;

each said disc having parallel and overlying laminate layers and defining said peripheral inclined sample tube apertures symmetrically distributed with respect to the central spin axis of said rotor, with said peripheral inclined sample tube apertures symmetrically distributed with respect to said top disc being spaced radially inwardly of said peripheral inclined sample tube apertures symmetrically distributed with respect to said bottom disc;

placing said discs over one another defining at the periphery thereof a stepped profile containing steps with respect to the spin axis of said rotor for retaining circumferential filament windings disposed to the periphery of said rotor; and placing said circumferential filament windings disposed about said steps normal to said spin axis, said circumferential filament windings filling said steps to impart to said rotor said frustum profile.

8. A process for the manufacture of a composite fixed angle rotor having a frustum profile with a central spin axis and peripheral inclined sample tube apertures according to claim 7 and comprising the further steps of:

placing a frustum shaped insert placed between said top and bottom discs, said frustum shaped insert defining a stepped profile on the exterior thereof; and extending said circumferential filament windings from said stepped profile containing steps defined by said top disc and bottom disc to said steps defined by said frustum shaped insert between said top and bottom discs.

9. A process for the manufacture of a composite fixed angle rotor having a frustum profile with a central spin axis and peripheral inclined sample tube apertures according to claim 7 and comprising the further steps of:

defining a step in said top disc of said rotor at the peripheral portion thereof having a surface for receiving a loop wind of filament having a vertical component downward towards said bottom disc;

defining a step in said bottom disc of said rotor at the peripheral portion thereof having a surface for receiving a loop wind of filament having a vertical component upward towards said top disc, said step in said bottom disc underlying said corresponding step in said top disc; and placing a vertical filament winding under tension encircling said steps for urging said top disc towards said bottom disc for resisting forces of vertical separation of said rotor.

10. A process for the manufacture of a composite fixed angle rotor having a frustum profile with a central spin axis and peripheral inclined sample tube apertures according to claim 9 and comprising the further steps of:

placing said at least one vertical filament winding exterior to said peripheral circumferential filament windings.

11. A process for the manufacture of a composite fixed angle rotor having a frustum profile with a central spin axis and peripheral inclined sample tube apertures according to claim 9 and comprising the further steps of:

placing said at least one vertical filament winding interior to said peripheral circumferential filament windings.

12. A process for the manufacture of a composite fixed angle rotor having a frustum profile with a central spin axis and peripheral inclined sample tube apertures according to claim 7 and comprising the further steps of:

placing between said top and bottom discs at least one disc therebetween, each said disc having a greater diameter than any disc overlying said disc and having a smaller diameter than any disc underlying said disc.

13. A composite fixed angle rotor having a frustum profile with a central spin axis and peripheral inclined sample tube apertures comprising:

a plurality of composite material discs including at least a top disc and a bottom disc, said top disc having a relatively small diameter for forming the top of said frustum shaped rotor, said bottom disc having a relatively large diameter for forming the bottom of said frustum shaped rotor, said plurality of composite material discs forming a central rotor body;

each said disc having parallel and overlying laminate layers and defining said peripheral inclined sample tube apertures symmetrically distributed with respect to the central spin axis of said rotor with said peripheral inclined sample tube apertures symmetrically distributed with respect to said top disc being spaced radially inwardly of said peripheral inclined sample tube apertures symmetrically distributed with respect to said bottom disc;

a step defined in said top disc of said rotor at the peripheral portion thereof having a surface for receiving a loop wind of filament having a vertical component downward towards said bottom disc;

a step defined in said bottom disc of said rotor at the peripheral portion thereof having a surface for receiving a loop wind of filament having a vertical component upward towards said top disc, said step in said bottom disc underlying said corresponding step in said top disc; and a vertical filament winding under tension encircling said steps for urging said top disc towards said bottom disc for resisting forces of vertical separation is said rotor.

14. A composite fixed angle rotor having a frustum profile with a central spin axis and peripheral inclined sample tube apertures according to claim 13 comprising:

said discs when overlying one another defining at the periphery thereof a stepped profile with respect to the spin axis of said rotor for retaining said circumferential filament windings disposed to the exterior of said rotor; and circumferential filament windings disposed and retained about said steps normal to said spin axis, said filament windings filling said steps to impart to said rotor said frustum profile.

15. A composite fixed angle rotor having a frustum profile with a central spin axis and peripheral inclined sample tube apertures according to claim 14 comprising:

a frustum shaped insert placed between said top and bottom discs, said frustum shaped insert defining a stepped profile containing steps on the exterior thereof; and said circumferential filament windings extending from said steps defined by said top disc and bottom disc at the peripheral portion to said steps defined by said frustum shaped insert between said top and bottom discs.

16. A composite fixed angle rotor having a frustum profile with a central spin axis and peripheral inclined sample tube apertures according to claim 13 comprising:

said top and bottom discs have at least one disc therebetween, each said disc having a greater diameter than a disc overlying said disc and having a smaller diameter than a disc underlying said disc.

17. A composite fixed angle rotor having a frustum profile with a central spin axis and peripheral inclined sample tube apertures comprising:

a plurality of composite-material discs including at least a top disc and a bottom disc, said top disc having a relatively small diameter for forming the top of said frustum shaped rotor, said bottom disc having a relatively large diameter for forming the bottom of said frustum shaped rotor;

each said disc having parallel and overlying laminate layers and defining said peripheral inclined sample tube apertures symmetrically distributed with respect to the spin axis of said rotor, with said peripheral inclined sample tube apertures symmetrically distributed with respect to said top disc being spaced inwardly of said peripheral inclined sample tube apertures symmetrically distributed with respect to said bottom disc;

said top disc defining about said sample tube apertures a female annulus; and a sample holder for placement to said sample tube apertures, said sample holder defining a male annulus complimentary to said female annulus in said top disc and having a body for extending into said sample tube apertures whereby upon centrifugation said male annulus on said sample tube holder bears down on said top disc towards the bottom disc of said rotor.

18. A process for the manufacture of a composite fixed angle rotor having a frustum profile with a central spin axis and peripheral inclined sample tube apertures comprising the steps of:

providing a plurality of composite material discs including at least a top disc and a bottom disc, said top disc having a relatively small diameter for forming the top of said frustum shaped rotor, said bottom disc having a relatively large diameter for forming the bottom of said frustum shaped rotor;

each said disc having parallel and overlying laminate layers and defining said peripheral inclined sample tube apertures symmetrically distributed with respect to the central spin axis of said rotor, with said peripheral inclined sample tube apertures symmetrically distributed with respect to said top disc being spaced radially inwardly of said peripheral inclined sample tube apertures symmetrically distributed with respect to said bottom disc;

placing said discs over one another defining at the periphery thereof a stepped profile containing steps with respect to the central spin axis of said rotor for retaining circumferential filament windings to the periphery of said rotor;

placing said circumferential filament windings disposed about said steps normal to said spin axis, said circumferential filament windings filling said steps to impart to said rotor said frustum profile;

placing said frustum shaped rotor within a mold having the net shape of said frustum shaped rotor; and curing said rotor and windings interior of said net shaped mold.

19. A process for the manufacture of a composite fixed angle rotor having a frustum profile with a central spin axis and peripheral inclined sample tube apertures according to claim 18 and comprising the further steps of:

placing a frustum shaped insert placed between said top and bottom discs, said frustum shaped insert defining a stepped profile containing steps on the exterior thereof; and extending said circumferential filament windings from said stepped profile containing steps defined by said top disc and bottom disc to said steps defined by said frustum shaped insert between said top and bottom discs.

20. A process for the manufacture of a composite fixed angle rotor having a frustum profile with a central spin axis and peripheral inclined sample tube apertures according to claim 18 and comprising the further steps of:

defining a step in said top disc of said rotor at the peripheral portion thereof having a surface for receiving a loop wind of filament having a vertical component downward towards said bottom disc;

defining a step in said bottom disc of said rotor at the peripheral portion thereof having a surface for receiving a loop wind of filament having a vertical component upward towards said top disc, said step in said bottom disc underlying said corresponding step in said top disc; and placing at least one vertical filament winding under tension encircling said steps for urging said top disc towards said bottom disc for resisting forces of vertical separation of said frustum shaped rotor.

21. A process for the manufacture of a composite fixed angle rotor having a frustum profile with a central spin axis and peripheral inclined sample tube apertures according to claim 20 and comprising the further steps of:

placing said at least one vertical filament winding exterior to said peripheral circumferential filament windings.

22. A process for the manufacture of a composite fixed angle rotor having a frustum profile with a central spin axis and peripheral inclined sample tube apertures according to claim 20 and comprising the further steps of:

placing said at least one vertical filament winding interior to said peripheral circumferential filament windings.

23. A process for the manufacture of a composite fixed angle rotor having a frustum profile with a central spin axis and peripheral inclined sample tube apertures according to claim 18 and comprising the further steps of:

placing between said top and bottom discs at least one disc therebetween, each said disc having a greater diameter than any disc overlying said disc and having a smaller diameter than any disc underlying said disc.

24. A process for the manufacture of a composite fixed angle rotor having a frustum profile with a central spin axis and peripheral inclined sample tube apertures according to claim 18 and comprising the further steps of:

impregnating said circumferential filament windings with resin before said windings are placed on said frustum shaped rotor.

25. A process for the manufacture of a composite fixed angle rotor having a frustum profile with a central spin axis and peripheral inclined sample tube apertures according to claim 18 and comprising the further steps of:

impregnating said circumferential filament windings with resin after said windings and rotor are placed within said mold.

26. A composite fixed angle rotor having a frustum profile with a central spin axis and peripheral inclined sample tube apertures comprising:

a central rotor body defining at the periphery thereof a stepped profile with respect to the spin axis of said rotor for retaining circumferential filament windings on the exterior of said rotor;

said circumferential filament windings disposed about said stepped profile normal to said spin axis, said filament windings filling said stepped profile to impart to said rotor said frustum profile, and, the central rotor body includes a frustum shaped insert, said frustum shaped insert defining a stepped profile on the exterior thereof;

said circumferential windings extend to said stepped profile defined by said frustum shaped insert; and, the central rotor body includes a vertical winding extending from the top of the central rotor body to the bottom of the central rotor body.

27. A composite fixed angle rotor having a frustum profile with a central spin axis and peripheral inclined sample tube apertures according to claim 26 comprising:

said vertical winding is interior of said circumferential windings.

28. A composite fixed angle rotor having a frustum profile with a central spin axis and peripheral inclined sample tube apertures according to claim 26 comprising:

said vertical winding is exterior of said circumferential windings.

29. A process for constructing a composite fixed angle rotor having a frustum profile with a central spin axis and peripheral inclined sample tube apertures comprising the steps of:

providing a central rotor body defining at the periphery thereof a stepped profile with respect to the spin axis of said rotor for retaining circumferential filament windings on the exterior of said rotor;

winding said circumferential filament windings about said stepped profile normal to said spin axis, said filament windings filling said stepped profile to impart to said rotor said frustum profile;

providing the central rotor body with a frustum shaped insert, said frustum shaped insert defining a stepped profile on the exterior thereof;

winding said circumferential windings to extend to said stepped profile defined by said frustum shaped insert; and, vertically winding the central rotor body with filament windings having a vertical component extending from the top of the central rotor body to the bottom of the central rotor body.

30. A process for constructing a composite fixed angle rotor having a frustum profile with a central spin axis and peripheral inclined sample tube apertures according to claim 29 comprising the steps of:

winding the vertical windings having a vertical component interior of said circumferential windings.

31. A process for constructing a composite fixed angle rotor having a frustum profile with a central spin axis and peripheral inclined sample tube apertures according to claim 29 comprising the steps of:

winding the vertical windings having a vertical component exterior of said circumferential windings.

32. A composite fixed angle rotor having a frustum profile with a central spin axis and peripheral inclined sample tube apertures comprising:

a central rotor body defining at the periphery thereof a stepped profile with respect to the spin axis of said rotor for retaining windings on the exterior of said rotor;

circumferential filament windings disposed about said stepped profile normal to said spin axis, said filament windings filling said stepped profile to impart to said rotor a frustum profile;

the central rotor body defining at the periphery thereof said stepped profile; said central rotor body consists of a plurality of discs; and, the central rotor body includes a vertical winding extending from the top of the central rotor body to the bottom of the central rotor body.

* * * * *